United States Patent [19]
Davis et al.

[11] Patent Number: 6,021,386
[45] Date of Patent: *Feb. 1, 2000

[54] CODING METHOD AND APPARATUS FOR MULTIPLE CHANNELS OF AUDIO INFORMATION REPRESENTING THREE-DIMENSIONAL SOUND FIELDS

[75] Inventors: Mark Franklin Davis, Pacifica; Craig Campbell Todd, Mill Valley, both of Calif.

[73] Assignee: Dolby Laboratories Licensing Corporation, San Francisco, Calif.

[ * ] Notice: This patent is subject to a terminal disclaimer.

[21] Appl. No.: 09/264,781

[22] Filed: Mar. 9, 1999

Related U.S. Application Data

[63] Continuation of application No. 08/862,587, May 23, 1997, Pat. No. 5,909,664, which is a continuation of application No. 08/472,231, Jun. 7, 1995, Pat. No. 5,633,981, which is a division of application No. 07/927,429, Sep. 4, 1992, Pat. No. 5,583,962, which is a continuation-in-part of application No. 07/804,976, Dec. 11, 1991, abandoned, which is a continuation-in-part of application No. 07/638,896, Jan. 8, 1991, abandoned.

[51] Int. Cl.$^7$ ................................................ G10L 9/18
[52] U.S. Cl. .......................................... 704/229; 704/230
[58] Field of Search ................................. 704/200, 229, 704/230, 205, 206, 500, 501, 502, 503, 504

[56] References Cited

U.S. PATENT DOCUMENTS

| | | |
|---|---|---|
| 3,067,287 | 12/1962 | Percival . |
| 3,067,292 | 12/1962 | Minter . |
| 4,256,389 | 3/1981 | Engebretson .............................. 352/11 |
| 4,455,649 | 6/1984 | Esteban et al. ......................... 370/522 |
| 5,323,396 | 6/1994 | Lokhoff ................................... 370/468 |
| 5,481,643 | 1/1996 | Ten Kate et al. ....................... 704/227 |
| 5,539,829 | 7/1996 | Lockoff et al. ............................. 381/2 |
| 5,583,962 | 12/1996 | Davis et al. ............................ 704/229 |
| 5,606,618 | 2/1997 | Lockoff et al. ............................. 381/2 |
| 5,621,855 | 4/1997 | Veldhuis et al. ........................ 704/229 |
| 5,632,005 | 5/1997 | Davis et al. ............................ 704/504 |
| 5,633,981 | 5/1997 | Davis ..................................... 704/230 |
| 5,850,418 | 12/1998 | Van De Kerkoff ..................... 375/240 |

FOREIGN PATENT DOCUMENTS

| | | | |
|---|---|---|---|
| 0372601 | 6/1990 | European Pat. Off. | .......... H04B 1/66 |
| 0402973 | 12/1990 | European Pat. Off. | ........ G11B 20/10 |
| 0497413 | 8/1992 | European Pat. Off. | .......... H04B 1/66 |
| 3734084 | 1/1992 | Germany | .......... H04R 5/04 |
| 871992 | 7/1961 | United Kingdom . | |
| WO9319542 | 9/1993 | WIPO | .............................. H04H 5/00 |

OTHER PUBLICATIONS

"Musicam—Surround: A Multi–Channel Stereo Coding Method," by Gunther Theile et al., Audio Engineering Society, 92 $_{nd}$ Convention, Mar. 24–27, 1992, Vienna, pp. 1–10.

"Subband Coding of Stereophonic Digital Audio Signals," by Robbert G. van der Waal, et al., IEEE, ICASSP, May 14, 1991, Toronto, pp. 3601–3604.

(List continued on next page.)

*Primary Examiner*—Richemond Dorvil
*Attorney, Agent, or Firm*—Gallagher & Lathrop; David N. Lathrop

[57] ABSTRACT

In an encoder, multiple channels of audio information representing multidimensional sound fields are split into subband signals and the subband signals in one or more subbands are combined to form composite signals. The composite signals, the subband signals not combined into a composite signal and information describing the spectral levels of subband signals combined into composite signals are assembled into an encoded output signal. The spectral level information conveys either the amplitude or power of the combined subband signals or the apparent direction of the sound field represented by the combined subband signals. In digital implementations, adaptive bit allocation may be used to reduce the informational requirements of the encoded signal.

26 Claims, 5 Drawing Sheets

OTHER PUBLICATIONS

"HDTV Sound Systems: How Many Channels?" by Gunther Theile, AES 9th Internation Conference, Feb. 1, 1991, pp. 217–232.

"Berlin Meeting Documents," Leonardo Chiariglione—Convenor, International Organization for Standardization, Dec., 1990, Appendix, pp. 101–103.

"Compatible Stereophonic Broadcastings Systems for Spatial Reproduction," by J. J. Geluk, Journal of the Audio Engineering society, Mar., 1980, vol. 28, No. 3, pp. 136–139.

"A Compressed–Bandwidth Stereophonic System for Radio Transmission," by W.S. Percival, Ph.D, The Institution of Electrical Engineers, Paper No. 3152 E, Nov., 1959.

CODING METHOD AND APPARATUS FOR MULTIPLE CHANNELS OF AUDIO INFORMATION REPRESENTING THREE-DIMENSIONAL SOUND FIELDS

CROSS-REFERENCE TO RELATED APPLICATIONS

This application is a continuation of U.S. patent application Ser. No. 08/862,587 filed May 23, 1997, now U.S. Pat. No. 5,909,664 which is a continuation of U.S. patent application Ser. No. 08/472,231 filed Jun. 7, 1995, now U.S. Pat. No. 5,633,981, which is a division of U.S. patent application Ser. No. 07/927,429 filed Sep. 4, 1992, now U.S. Pat. No. 5,583,962, which is a continuation-in-part of U.S. patent application Ser. No. 07/804,976 filed Dec. 11, 1991, now abandoned, which is a continuation-in-part of U.S. patent application Ser. No. 07/638,896 filed Jan. 8, 1991, now abandoned.

TECHNICAL FIELD

The invention relates in general to the recording, transmitting, and reproducing of multi-dimensional sound fields intended for human hearing. More particularly, the invention relates to the high-fidelity encoding and decoding of signals representing such sound fields, wherein the encoded signals may be carried by a composite audio-information signal and a steering control signal.

BACKGROUND ART

A. Goal of High-Fidelity Reproduction

A goal for high-fidelity reproduction of recorded or transmitted sounds is the presentation at another time or location a faithful representation of an "original" sound field. A sound field is defined as a collection of sound pressures which are a function of time and space. Thus, high-fidelity reproduction attempts to recreate the acoustic pressures which existed in the original sound field in a region about a listener.

Ideally, differences between the original sound field and the reproduced sound field are inaudible, or if not inaudible at least relatively unnoticeable to most listeners. Two general measures of fidelity are "sound quality" and "sound field localization."

Sound quality includes characteristics of reproduction such as frequency range (bandwidth), accuracy of relative amplitude levels throughout the frequency range (timbre), range of sound amplitude level (dynamic range), accuracy of harmonic amplitude and phase (distortion level), and amplitude level and frequency of spurious sounds and artifacts not present in the original sound (noise). Although most aspects of sound quality are susceptible to measurement by instruments, in practical systems characteristics of the human hearing system (psychoacoustic effects) render inaudible or relatively unnoticeable certain measurable deviations from the "original" sounds.

Sound field localization is one measure of spatial fidelity. The preservation of the apparent direction, both azimuth and elevation, and distance of a sound source is sometimes known as angular and depth localization, respectively. In the case of certain orchestral and other recordings, such localization is intended to convey to the listener the actual physical placement of the musicians and their instruments. With respect to other recordings, particularly multitrack recordings produced in a studio, the angular directionality and depth may bear no relationship to any "real-life" arrangement of musicians and their instruments and the localization is merely a part of the overall artistic impression intended to be conveyed to the listener. In any case, one purpose of high-fidelity multi-channel reproduction systems is to reproduce spatial aspects of an on-going sound field, whether real or synthesized. As with respect to sound quality, in practical systems measurable changes in localization are, under certain conditions, inaudible or relatively unnoticeable because of characteristics of human hearing.

Even with respect to those recordings in which the localization is intended to convey the impression of being present at the original recording, the producer must choose among various philosophies of microphone placement and sound mixing and recording, each of which results in the capturing of sound fields that differ from one another. Apart from variations introduced by artistic and technical judgments and preferences, the capture of a sound field is at best an approximation of the original sound field because of the inherent technical and practical limitations in recording, transmission and reproducing equipment and techniques.

Numerous decisions, adjustments, and combinations available to a sound field producer will be obvious to one skilled in the art. It is sufficient to recognize that a producer may develop recorded or transmitted signals which, in conjunction with a reproduction system, will present to a human listener a sound field possessing specific characteristics in sound quality and sound field localization. The sound field presented to the listener may closely approximate the ideal sound field intended by the producer or it may deviate from it depending on many factors including the reproduction equipment and acoustic reproduction environment.

In most, if not all cases, the sound field producer works in a relatively well defined system in which there are known playback or presentation configurations and environments. For example, a two-channel stereophonic recording is expected to be played back or presented by either a stereophonic or a monophonic playback or presentation system. The recording is usually optimized to sound good to most listeners having a wide variety of stereophonic and monophonic equipment ranging from the very simple to the very sophisticated. As another example, a recording in stereo with surround sound for motion pictures is made with the expectation that motion picture theaters will have either a known, generally standardized arrangement for reproducing the left, center, right, bass and surround channels or, alternatively, a classic "Academy" monophonic playback. Such recordings are also made with the expectation that they will be presented in home listening environments with equipment ranging from a television with one small loudspeaker to relatively sophisticated home surround sound systems which closely replicate a theater surround sound experience.

A sound field captured for transmission or reproduction is at some point represented by one or more electrical signals. Such signals usually constitute one or more channels at the point of sound field capture ("capture channels"), at the point of sound field transmission or recording ("transmission channels"), and at the point of sound field presentation ("presentation channels"). Although within some limits as the number of these channels increases, the ability to reproduce complex sound fields increases, practical considerations impose limits on the number of such channels.

Early sound recording and reproducing systems relied on single transmission and presentation channels. Later, multichannel systems came into use, the most popular of which for music continues to be the stereophonic system, comprising two transmission and presentation channels. Motion picture and home video sound systems commonly employ four or more presentation channels. Techniques such as audio matrixing have been used to reduce the number of transmission channels, particularly for carrying audio information for four presentation channels in the two track media of motion picture optical soundtracks and home video. Such matrixing techniques permit an approximate reproduction of the sound field that would be produced from four presentation channels carried by four transmission channels. Existing matrix techniques, however, result in a degradation of the reproduced sound field, particularly with respect to the separation between presentation channels, even when matrix enhancement circuits are employed in the recovery of matrixed sound signals.

Accordingly, despite the inefficiency of doing so, it is sometimes necessary to maintain many transmission channels throughout the recording and transmitting process in order to achieve desirable levels of spatial fidelity.

Aside from the choices mentioned above, the representation of a sound field by one or more channels also involves additional artistic and technical choices. A sound field producer may choose how many capture channels to employ and how the sound field is to be "mapped" onto the capture channels. The sound field transmitter may choose the number of transmission channels, and how the audio information is coded for recording or transmission. The listener may choose the number of presentation channels, or the choice may be dictated by the listener's reproducing equipment, requiring, for example that a sound field recorded in a two channel stereophonic format be played back or presented through a single monophonic channel system. The listener may also choose where transducers or loudspeakers reproducing the channels are placed in a listening environment and whether to "enhance" or modify the sound by boosting or cutting portions of the sound spectrum or by adding reverberation or ambience. In some cases, the listener has little control such as in motion picture theaters.

The number of channels employed by the system, however, should not be a source of concern to the listener once the system is set up and operating. The listener's attention should not be audibly attracted by such technical details of the sound system any more than a viewer should be visibly aware that color television uses only three colors rather than the entire visible spectrum.

Deviations between the desired sound field and the actually reproduced sound field often arise because of a desire to minimize the amount of information required to achieve high-fidelity reproduction. One example, mentioned above, is the use of a matrix to convey four channels of sound information on two track media. There is a desire among workers in the audio art, however, to more exactly preserve the original sound field while at the same time even further reducing the amount of information required to represent the sound field during the transmission and recording process. By reducing the amount of required information, signals may be conveyed by transmission channels with reduced information capacity, such as lower bandwidth or noisier transmission paths, or lower storage capacity recording media. Ideally, such an arrangement with reduced information requirements should allow the reproduction of a sound field audibly indistinguishable or nearly indistinguishable from the originally intended sound field.

B. Information Reduction Techniques

Informational requirements can sometimes be reduced without loss of perceptible audio quality by various techniques. Analog signals which have been subject to audio compression or dynamic range reduction, for example, impose lower transmission information capacity requirements than such signals without compression. Digital signals encoded with fewer binary bits impose lower transmission information capacity requirements than coded signals using a greater number of bits to represent the signal. Of course, there are limits to the amount of reduction which can be realized without audibly degrading audio quality. The following paragraphs discuss limitations more particular to digital techniques, but it should be realized that corresponding considerations apply to analog techniques as well.

Bit requirements for digital signals are proportional to the number of bits used to represent each digitized signal sample and to the number of the digitized signal samples. The number of samples for a given segment of signal is generally established by the sampling rate.

The minimum sampling rate is dictated by the Nyquist theorem. The Nyquist theorem holds that a signal may be accurately recovered from discrete samples only when the interval between samples is no larger than one-half the period of the signal's highest frequency component. When the sampling rate is below this Nyquist rate, higher-frequency components are misrepresented as lower-frequency components. The lower-frequency component is an "alias" for the true component.

The number of bits available for representing each digitized signal sample establishes the accuracy of the signal representation by the encoded signal samples. Lower bit rates mean that fewer bits are available to represent each sample; therefore lower bit rates imply greater quantizing inaccuracies or quantizing errors. In many applications, quantizing errors are manifested as quantizing noise, and if the errors are of sufficient magnitude, the quantizing noise will degrade the subjective quality of the coded signal.

Some prior art techniques claim to reduce information requirements without any audible degradation by exploiting various psychoacoustic effects. The human ear displays frequency-analysis properties resembling those of highly asymmetrical tuned filters having variable center frequencies and bandwidths that vary as a function of the center frequency. The ability of the human ear to detect distinct tones and resolve their direction generally increases as the difference in frequency between the tones increases, however, the ear's resolving ability remains substantially constant for frequency differences less than the bandwidth of the above mentioned filters. Thus, the frequency-resolving and direction-discerning ability of the human ear varies according to the bandwidth of these filters throughout the audio spectrum. The effective bandwidth of such an auditory filter is referred to as a "critical band." A dominant signal within a critical band is more likely to mask the audibility of other signals, even signals with a different apparent direction, anywhere within that critical band than it is likely to mask other signals at frequencies outside that critical band. See generally, the *Audio Engineering Handbook*, K. Blair Benson ed., McGraw-Hill, San Francisco, 1988, pages 1.40–1.42 and 4.8–4.10.

Signal recording, transmitting, or reproducing techniques which divide the useful signal bandwidth into frequency bands with bandwidths approximating the ear's critical bands can better exploit psychoacoustic effects than wider band techniques. Critical band techniques comprise dividing the signal bandwidth with a filter bank, processing the signal passed by each filter band, and reconstructing a replica of the original signal with an inverse filter bank. Two such techniques are subband coding and transform coding. Subband and transform coders can reduce transmitted information in particular frequency bands where the resulting coding inaccuracy or noise is psychoacoustically masked by neighboring spectral components without degrading the subjective quality of the encoded signal.

Subband coders may use either analog or digital techniques, or a hybrid of the two techniques. The subband coder filter bank can be implemented by a bank of digital bandpass filters or by a bank of analog bandpass filters.

For digital filter subband coders, the input signal is sampled prior to filtering. The samples are passed through a digital filter bank and then downsampled to obtain a subband signal. Each subband signal comprises samples which represent a portion of the input signal spectrum.

For analog filter subband coders, the input signal is split into several analog signals each with a bandwidth corresponding to the filter bank bandpass filter bandwidths. The subband analog signals can be kept in analog form or converted into in digital form by sampling and quantizing.

Digital transform coders may be implemented by any of several time-domain to frequency-domain transforms which implement a bank of digital bandpass filters. The sampled input signal is segmented into "signal sample blocks" prior to filtering. One or more adjacent transform coefficients can be grouped together to define "subbands" having effective bandwidths which are sums of individual transform coefficient bandwidths.

Throughout the following discussion, the term "subband coder" shall refer to true subband coders, transform coders, and other coding techniques which operate upon portions of the useful signal bandwidth. The term "subband" shall refer to these portions of the useful signal bandwidth, whether implemented by a true subband coder, a transform coder, or other technique.

The term "subband block" shall refer to the representation of the spectral energy across the useful signal bandwidth for a given interval or block of time. For true subband coders implemented by a digital filter bank, a subband block comprises the set of samples for all subbands over a given time interval. For true subband coders implemented by an analog filter bank, a subband block comprises all of the subband signals for a time-interval segment. For transform coders, a subband block comprises the set of all transform coefficients corresponding to a signal sample block.

The inventors have determined experimentally that, for practical purposes, once the signal has been split into subbands having bandwidths on the order of or narrower than the ear's critical bands, when sounds within a subband appear to come from one speaker or presentation channel, or from some position between two speakers or presentation channels, then the ear does not perceive any sound within that subband coming from anywhere else. This effect is illustrated conceptually in FIG. 1; listener 101 is perceiving that sounds within a subband come from point 111 between loudspeakers 102 and 104 even though sounds within the subband actually come from loudspeakers 102 through 110.

When each of two acoustic signals separated in frequency by substantially more than a critical band is reproduced by separate presentation channels such as loudspeakers or headphone transducers, a listener is able to perceive that each of the two signals originates from a distinct source. As the separation in frequency between two signals diminishes to within a critical band, however, the ability of a listener to perceive them as originating from distinct sources also diminishes.

Thus, the informational capacity required to convey multiple channels of audio signals representing a sound field may be reduced by splitting the audio signal channels into subbands with bandwidths substantially the same or less than that of the ear's critical bandwidths, transmitting or recording each subband as a composite signal comprising spectral amplitudes and directional information, and generating at the time of playback or presentation a set of signals which preserve the amplitudes and directions of each subband.

Additional techniques may be employed to further reduce the information capacity required to achieve a given level of signal reproduction quality. Each achieves a reduction at the expense of reducing signal reproduction accuracy. One digital technique is floating-point representation of numbers. Floating-point numbers can represent a wider range of values with fewer bits than is possible with integer representation. A floating-point number comprises a mantissa and an exponent. Another digital technique is block-floating-point representation. Using this technique, several quantities are represented as a group or block of mantissas associated with a single exponent. For either floating-point technique, the exponent may be seen as a scale factor or gross quantization level. The mantissa may be seen as the object of the scale factor, or a finer quantization level.

DISCLOSURE OF INVENTION

The present invention is directed to multiple-channel sound coding/transmission systems in which reproduced sound fields are audibly indistinguishable or nearly indistinguishable from a sound field that would be generated by a discrete channel system and which also are audibly superior to known 4–24 matrix systems with enhanced decoding but which conserve substantial bandwidth relative to such prior art discrete and matrix systems. In accordance with the present invention, an encoder may produce a composite audio-information signal representing the sound field to be reproduced and a steering control signal. The composite audio-information signal has its frequency spectrum broken into a number of subbands, preferably commensurate with the critical bands of the human ear. The steering control signal has components relating to each of the subbands. Although the invention may be implemented using analog or digital techniques or even a hybrid arrangement of such techniques, the invention is more conveniently implemented using digital techniques and the preferred embodiments disclosed herein are digital implementations.

It should also be understood that although the use of subbands with bandwidths commensurate with the human ear's critical bandwidths allows greater exploitation of psychoacoustic effects, application of the teachings of the present invention are not so limited. It will be obvious to those skilled in the art that these teachings may be applied to wideband signals as well; therefore, reference to subbands throughout the remaining discussion should be construed as one or more frequency bands spanning the total useful bandwidth of input signals.

In a first embodiment of the invention, an encoder receives a plurality of input channels and provides at its decoder the same number of output channels. The encoded information may include for each subband a discrete representation for each of the input channels and/or an aggregate representation for some or all of the input channels. The aggregate representation comprises a composite audio-information signal and a steering control signal representing an approximation of the input channel levels for each of the subbands in the composite audio-information signal.

FIG. 2 is a conceptual illustration of how the first embodiment forms the aggregate representation. An encoder comprising processes 204 and 206 receives subband signals representing a sound field from a plurality of input channels 202. Process 204 combines the input signals into a composite audio-information signal which it passes along path 208. Process 206 determines input channel levels and establishes a steering control signal representing the levels of each channel which it passes along path 210. Paths 208 and 210, collectively, are referred to herein as a composite channel. A decoder comprising process 212 receives a composite channel signal from paths 208 and 210, and apportions composite channel subbands to generate output signals along output channels 214 for presentation of the sound field.

In a second embodiment of the invention, an encoder receives sound field signals from a plurality of input channels as well as localization characteristics of each of those input channels. The decoder receives an encoded signal as well as the localization characteristics of the transducer for each output channel, and provides a signal for each output channel to reproduce as accurately as possible the sound field represented by the input channel signals. The encoded information may include for each subband a discrete representation for each of the input channels and/or an aggregate representation for some or all of the input channels. The aggregate representation comprises a composite audio-information signal representing the net overall sound field level, and a steering control signal comprising sound field localization information for each of the subbands in the composite audio-information signal. This localization information is referred to herein as a net directional vector.

FIG. 3 is a conceptual illustration of how the second embodiment forms the aggregate representation. An encoder comprising processes 304 and 306 receives subband signals representing a sound field from a plurality of input channels 302, and receives from path 303 information regarding how the sound field is mapped onto each of those input channels. Process 304 combines the input signals into a composite audio-information signal which it passes along path 308. Process 306 determines net directions and establishes a steering control signal representing the apparent directions of the sound field which it passes along path 310. Paths 308 and 310, collectively, are referred to herein as a composite channel. A decoder comprising process 312 receives from path 313 information regarding the number of output channels and the spatial configuration of output channel transducers in the presentation system, receives a composite channel signal from paths 308 and 310, and apportions composite channel subbands to generate output signals along output channels 314 for presentation of the sound field.

The encoded signals of the second embodiment may be derived from those of the first embodiment provided that the relationship between the multiple channels and the desired reproduced sound field is known. In general, the encoded signals of the first embodiment cannot be derived from those of the second embodiment, at least for the case of a system in which the sound field is intended to be carried by more than two channels. This is because many combinations of channel amplitudes can produce the same net directional vector.

In practical applications of the first and second embodiments, the information to the encoder is a multiplicity of input channels. In the case of the second embodiment, however, the encoder is concerned with the localization characteristics of the desired reproduced sound field; therefore it must receive localization information about the input channels and how those input channels are intended to relate to that sound field. For example, in the case of a five-channel motion picture system having left, center, right, left surround and right surround reproduction by generally standardized loudspeaker locations, the net directional vector can be derived from the five channel signals intended to be applied to those loudspeaker locations. A decoder according to the second embodiment, receiving information as to the playback or presentation environment, can use the net directional vector to produce a set of signals for the intended five channel playback or presentation, or for another playback or presentation environment using a different number of channels and/or loudspeaker locations. For example, the composite audio-information signal and net directional vector can be decoded for a three-channel left-, center- and right-channel playback or presentation arrangement.

With respect to both embodiments, it is desired that the reproduced sound field when produced by a playback or presentation arrangement should be audibly indistinguishable or nearly indistinguishable by most listeners from that presented by a system having the same number of discrete capture, transmission, and presentation channels.

The invention is not restricted for use with any particular scheme for generating multiple input channels nor any particular scheme for capturing or recreating sound fields. In the case of the first or Type I embodiment, the invention accepts as an input at the encoder any set of multiple input channels, however derived, and provides as an output at the decoder an approximation of the set of multiple input channels. In the case of the second or Type II embodiment, the invention accepts as an input at the encoder any set of multiple input channels with information necessary to define how the producer of the input channels intended them to produce a sound field, e.g., their intended direction with respect to the listener, and provides as an output at a decoder a set of presentation channels which produce the best possible sound field commensurate with the capabilities of the playback or presentation equipment and environment.

As discussed above, the present invention applies to subband coders implemented by any of several techniques. A preferred implementation uses a transform, more particularly a time-domain to frequency-domain transform according to the Time Domain Aliasing Cancellation (TDAC) technique. See Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161. An example of a transform encoder/decoder system utilizing a TDAC transform is described in International Publication No. WO 90/09022, which is hereby incorporated by reference in its entirety.

Typical single-channel subband encoding, as shown in FIG. 4, comprises splitting the input signal into subbands by Filter Bank 1010, converting the subband information into quantized code words by Encoder 1030, and assembling the quantized code words into a form suitable for transmission or storage by Formatter 1040. If the Filter Bank is implemented by digital filters or discrete transforms, the input signal is sampled and digitized prior to filter bank filtering by Sampler 1000. If the filter bank is implemented by analog filters, the subband signals may be sampled and digitized by Sampler 1020 for digital coding by Encoder 1030. The present invention relates to Encoder 1030 for multiple channels of information.

Typical single-channel digital subband decoding, as shown in FIG. 5, comprises disassembling the formatted code words by Deformatter 1050, recovering the subband information by Decoder 1060, and merging the subband information into a single-channel signal by Inverse Filter Bank 1080. If the Inverse Filter Bank is implemented by analog filters and the signal is digitally encoded, the subband information is converted into analog form prior to the inverse filter bank filtering by Converter 1070. If the inverse filter bank is implemented by digital filters or discrete transforms, the digital signal is converted into analog form by Converter 1090. The present invention relates to Decoder 1060 for multiple channels of information.

In accordance with the teachings of the present invention for encoding, a process called subband steering combines spectral components from two or more channels in a particular subband to form a composite audio-information signal and a steering control signal. FIG. 6 illustrates the concept. Multiple input channels are represented by horizontal bars labeled Ch A, Ch B, Ch C, . . . Ch Z. These input channels are divided into subbands represented by vertical columns labeled SB 0, SB 1, . . . SB N. The subbands collectively span the useful bandwidth of the input channels. Another channel is a composite channel represented in FIG. 6 by the horizontal bar labeled "composite." The composite channel is a theoretical construct useful for understanding subband steering and comprises the composite audio-information signal and the steering control signal.

Subband steering combines subband spectral components from the multiple input channels into a composite representation. For example, referring to FIG. 6, spectral components in subband SB 1 for channels Ch A through Ch Z are combined into a single subband set of spectral components, represented by the cross-hatched area in subband SB 1 for the composite channel. The composite representation for subband SB 1 may be transmitted or recorded instead of the individual channel subband spectral components represented by the composite channel subband.

According to the teachings of the present invention, not all subbands need be steered. Referring again to FIG. 6, subband spectral components for channels Ch A through Ch Z in subband SB 0, for example, are not steered. The composite channel does not contain any composite representation for this subband. Thus, an embodiment of the present invention can encode multiple channels representing a sound field into a mixture of discrete channel representations and composite channel representations. A "steered subband" is a subband in which spectral components from two or more channels are combined into a composite representation. The composite representation of all steered subbands, comprising composite audio-information signals and steering control signals, is the "composite channel. " The channels represented by the composite channel are the "steered channels."

A steering control signal is generated in either of two ways. The first or Type I embodiment shown conceptually in FIG. 2 generates a steering control signal which conveys the levels of the spectral components from all the steered channels. The second or Type II embodiment shown conceptually in FIG. 3 generates a steering control signal which represents the apparent directions, or net directional vectors, of the spectral components from all steered channels.

Also in accordance with the teachings of the present invention, the encoding of discrete multiple channels may employ adaptive subband steering. In cases where some number of discrete transmission channels is highly desired for a particular application, adaptive steering permits discrete channels to be transmitted whenever possible. With adaptive subband steering, steering of a given subband may be utilized whenever the transmission channel capacity will otherwise be exceeded by the amount of information required to transmit encoded spectral components for discrete channels. Thus, the steering process is applied only to particular subbands which otherwise will receive an insufficient channel capacity to achieve a desired level of coding accuracy. The composite representation of spectral components is encoded rather than the subband spectral components in the steered channels.

Further in accordance with the teachings of the present invention for encoding, the steering process may be restricted to only certain subbands with spectral components in other subbands always processed as discrete channel information. It should be appreciated by one skilled in the art that different criteria may be used to exclude selected subbands from subband steering. For example, some or all subbands in high-priority channels may be excluded from subband steering, or high-priority subbands within some or all channels may be excluded from subband steering. It should also be appreciated that the exclusion criteria may be fixed or may be adaptively selected according to signal content and coding requirements. Again by example, subbands from multiple channels which contain dominant spectral components which are out-of-phase with each other can be adaptively excluded from the steering process because subband steering may produce an audible loss of signal.

Further yet in accordance with the teachings of the present invention for encoding, signal loss resulting from steering channels with out-of-phase spectral components can be avoided or minimized by any of several compensation schemes. One scheme establishes minimum levels for the amplitude of spectral components in the composite channel. Another scheme adjusts the phase of spectral components in individual channels prior to forming the composite channel and passes side information to a decoder enabling it to reverse the phase adjustments.

In accordance with the teachings of the present invention for digital encoding techniques, numerical values representing the spectral components are quantized into code words, wherein a variable number of bits are adaptively allocated to at least some of the code words from a pool of bits. The bit allocation is based on whether, because of current signal content, quantizing errors in some subbands will degrade signal coding quality to a greater extent than quantizing errors in other subbands. More particularly, more bits are assigned to spectral components within subbands whose quantizing noise is considered more audible than quantizing noise in other subbands.

Further in accordance with the teachings of the present invention for digital encoding, the audible effects of quantizing errors may be reduced by altering the statistical characteristics of the quantizing errors of the spectral components. In one embodiment, such altering is not used for subbands in which little or no spectral energy is present.

In accordance with the teachings of the present invention for decoding, whenever subband steering is used during encoding, inverse steering uses the steering control signal to recover a representation of the steered channels from the composite channel. For Type I coding, multiple channels of information are recovered, each recovered channel corresponding to one of the input channels. For Type II coding, one or more channels are generated for presentation on a specific presentation system. The number of channels for Type II decoders is dictated by characteristics of the presentation system and are therefore not necessarily equal to the number of input channels.

Also in accordance with the teachings of the present invention for digital decoding techniques, an adaptive bit allocation process substantially similar to that used during encoding is performed to determine the number of bits assigned to each quantized code word. This information is used to reconstruct the subband spectral components.

Further in accordance with the teachings of the present invention for digital decoding, quantizing errors are reduced by statistically enhancing the reconstruction of spectral components. In one embodiment, such statistical enhancement is not used for subbands in which little or no spectral energy is present.

The various features of the invention and its preferred embodiments are set forth in greater detail in the following "Modes for Carrying Out the Invention" and in the accompanying drawings.

Table I shows the transform coefficient subband grouping, master and subband exponent structure, and coefficient allocation requirements for a preferred embodiment of the invention as it relates to subband quantizing when used with a 512 point TDAC transform based encoder for a 20 kHz bandwidth signal sampled at 48 kHz.

MODES FOR CARRYING OUT THE INVENTION

The present invention may be implemented using a variety of analog and digital coding techniques. The invention is more conveniently implemented using digital techniques and the embodiments disclosed herein are digital implementations.

Digital implementations may employ adaptive bit allocation techniques. The following description of a preferred embodiment discloses both adaptive bit allocation and subband steering concepts, however, it should be understood that digital implementations of subband steering may be utilized with bit allocation schemes which are not adaptive. The adaptive bit allocation process disclosed may also be utilized in an encoder/decoder system without subband steering.

The preferred embodiment discussed below discloses an adaptive steering technique more particularly suited to digital implementations using adaptive bit allocation, but it should be understood that subband steering may be nonadaptive, i.e., utilized continually. Variations in subband steering are discussed below.

I. Preferred Embodiment of Invention

Figure 7:
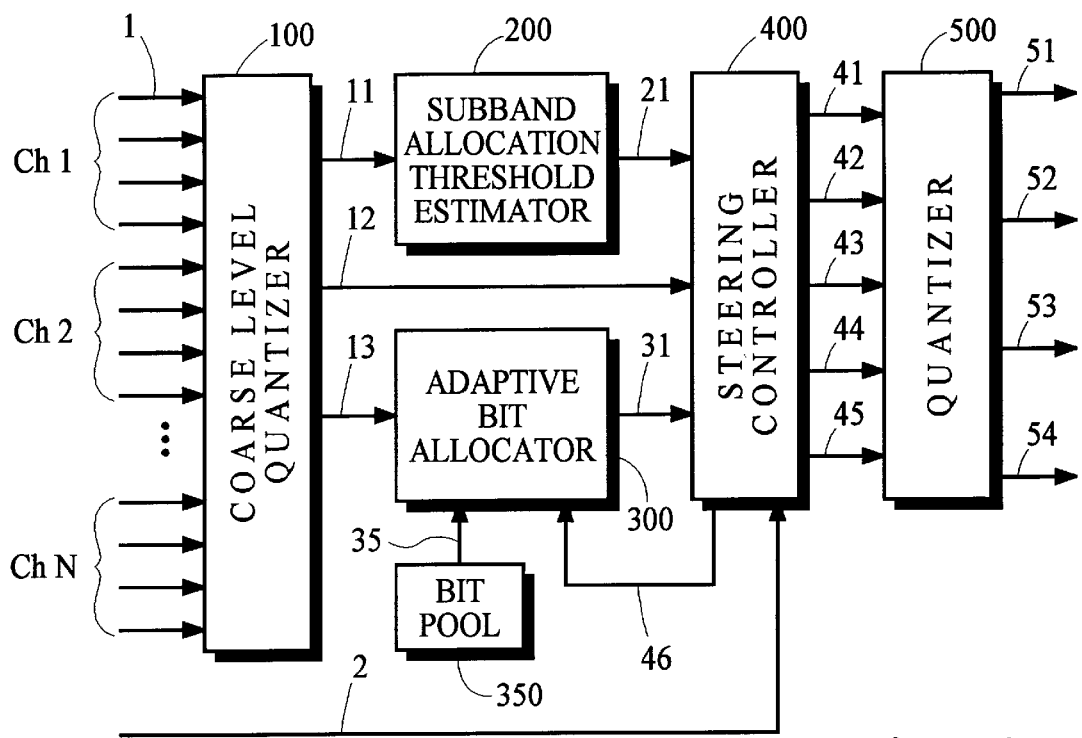
FIG. 7 is a functional block diagram illustrating a basic structure of the invention as it relates to subband encoding.

The basic structure for a preferred embodiment of the present invention as it relates to subband encoding is illustrated in FIG. 7. In this preferred embodiment, the present invention as a Type I encoder comprises a Coarse Level Quantizer 100 which coarsely quantizes multiple channels of subband spectral information, each channel represented as portions of a path 1 labeled Ch 1, Ch 2, . . . , Ch N; a Subband Allocation Threshold Estimator 200 which estimates the minimum number of bits required for each subband to achieve a given level of signal coding quality in response to coarse quantization information received from a path 11; an Adaptive Bit Allocator 300 which allocates a number of bits to various subbands in response to coarse quantization information received from a path 13, steering information received from path 46, and the number of bits available for allocation received from a path 35 from a Bit Pool 350 shared among at least some of the channels; a Steering Controller 400 which steers selected subbands into a composite spectral information in response to estimated required allocation thresholds received from a path 21, bit allocation information received from a path 31, and coarse quantization information and spectral component information received from a path 12; a Quantizer 500 which quantizes the steering and spectral information received from paths 41 through 45 into quantized code words and passes the quantized code words, coarse quantization, and steering information along paths 51 through 54.

In this preferred embodiment, the present invention as a Type II encoder further comprises an input path 2 along which the Steering Controller 400 receives information describing the localization characteristics for each channel signal.

Figure 8:
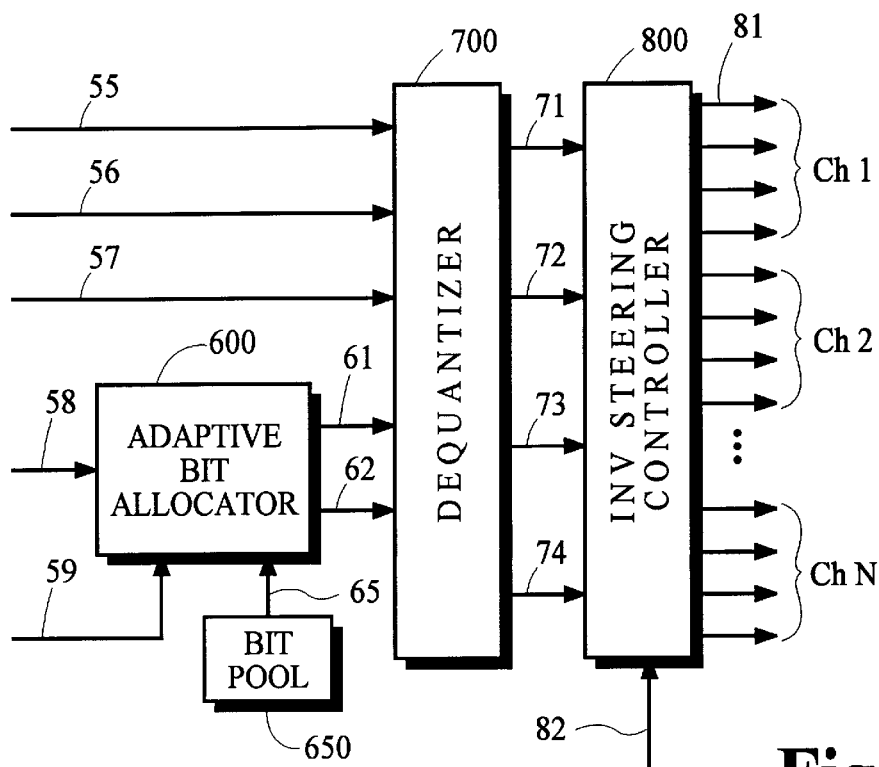
FIG. 8 is a functional block diagram illustrating a basic structure of the invention as it relates to subband decoding.

The basic structure for a preferred embodiment of the present invention as it relates to subband decoding is illustrated in FIG. 8. In this preferred embodiment, the present invention as a Type I decoder comprises an Adaptive Bit Allocation Calculator 600 which determines the number of bits allocated to each code word during quantizing in response to coarse quantization information received from a path 58, steering control flags received from a path 59, and the number of bits available for allocation received from a path 65 from a Bit Pool 650; a Dequantizer 700 which dequantizes the steering control signal received from a path 55 and which recovers spectral component information in response to quantized code words received from a path 56, coarse quantization information received from a path 57, and bit allocation information received from a path 61, and which passes along on a path 74 the steering control flags received from a path 62; and an Inverse Steering Controller 800 which reconstructs steered subbands in response to steering and composite spectral information received from paths 71 through 74 and provides a complete set of subbands for multiple channels of subband spectral information, each channel represented as portions of a path 81 labeled Ch 1, Ch 2, . . . , Ch N.

In this preferred embodiment, the present invention as a Type II decoder further comprises an input path 82 from which the Inverse Steering Controller 800 receives information describing the number of output channels and the location of transducers such as loudspeakers connected to the output channels.

The preferred embodiment of the present invention as it relates to encoding and decoding is presented in more detail in the following sections. Alternate embodiments and structures for the present invention are presented throughout the discussion.

A. Coarse Level Quantizer

Referring to FIG. 7 which illustrates the present invention as it relates to subband encoding, it may be seen that Coarse Level Quantizer 100 receives multiple channels of subband information along path 1. If the subband blocks are derived by a discrete transform such as the Discrete Fourier Transform (DFT), each subband will consist of one or more discrete transform coefficients. Table I illustrates one particular subband grouping of transform coefficients for a 20 kHz bandwidth signal. The table is based on a 512 point transform and an input signal sampling rate of 48 kHz. The subbands correspond generally to the ear's critical bands. Other subband groupings, sampling rates, and transform lengths may be utilized without departing from the scope of the present invention.

In a preferred embodiment of the invention, the Coarse Level Quantizer coarsely quantizes the spectral components by establishing the exponent for the spectral components as expressed in block-floating-point form. Although many formats are possible, the format contemplated for the present invention comprises master exponents for groups of subbands, one block exponent for each subband, and one mantissa for each spectral component within each subband.

The mantissa is represented as a signed integer-valued expression expressed in two's complement form. In the two's complement form, the mantissa's most significant bit is a sign bit. The next most significant bit represents data and is referred to here as the most significant data bit. A sign bit with a value of zero denotes a nonnegative number; conversely, a sign bit with a nonzero value denotes a negative number. A positive nonzero. mantissa is said to be "normalized" when its most significant data bit is nonzero. A negative-valued nonzero mantissa is normalized when its most significant data bit is zero. A normalized mantissa ensures that the greatest number of significant bits for the numerical quantity is contained within the mantissa's limited bit length.

The exponent is an unsigned integer whose value equals the number of right shifts required to convert the normalized mantissa into the true value of the represented numerical quantity. The Coarse Level Quantizer calculates the subband exponents by finding the largest spectral component in each subband and determining the number of left shifts required to normalize it. Because block-floating-point representation uses one exponent for a block of mantissas, some mantissas in the block may not be normalized. The mantissa for the quantity with the largest magnitude in the block will be normalized provided it is not too small, i.e., the exponent is capable of expressing the number of right shifts required to convert the normalized quantity into its true value. Whether the mantissas are normalized or not, however, the exponent always represents the number of times each integer-valued mantissa in the block must be shifted to the right to obtain the true value of the floating-point quantity.

Master exponents are unsigned 2-bit integers used to increase the dynamic range of the block-floating-point representation. Each master exponent indicates whether the subband exponents within the group of subbands associated with the master exponent have been adjusted to accommodate lower level signals. Referring to Table I, it may be seen that master exponent MEXP0 represents subbands 0 through 16. Master exponent MEXP1 represents higher frequency subbands 17 through 38. In a preferred embodiment of the invention, if all subband exponents in a group are two or greater, the master exponent for that group is set to one and all subband exponents in that group are reduced by two. If all subband exponents in a group are four or greater, the master exponent for that group is set to two and the subband exponents in that group are reduced by four. If all subband exponents in a group are six or greater, the master exponent for that group is set to three and all subband exponents in that group are reduced by six. When a master exponent is set to one, for example, it indicates that all normalized mantissas within all subbands in the group are shifted to the left two more times than is indicated by the subband exponent values. When a master exponent is zero, each subband exponent in the group equals the number of left shifts for each normalized mantissa in the subband. These master exponents permit using shorter subband exponents while allowing for a sufficient dynamic range. A four-bit subband exponent in conjunction with a two-bit master exponent used in the manner described here extends the dynamic range of each associated mantissa by approximately 126 dB.

Subband exponents which have been reduced or adjusted as described above to reflect the master exponent value are said to be "biased"; thus, the value of an "unbiased" exponent accurately represents the number of right shifts required to convert an associated normalized mantissa into its true value. The bias operation is performed by Quantizer 500, discussed below. Throughout the following discussion of preferred embodiments, the terms "exponent," "subband exponent," and other similar terms refer to unbiased exponents unless a contrary meaning is expressly stated.

In alternative embodiments of the present invention, spectral components may be encoded into other forms such as a set of scaled values with linear multiplicative scaling factors. Other floating-point formats may also be used. The essence of the coarse level quantizing process is to derive a coarse measure of subband contents, such as block-floating-point exponents, and a corresponding finer measure of the spectral components within that subband, such as floating-point mantissas.

In a preferred embodiment of the present invention, the Coarse Level Quantizer passes subband exponents along path 11 to Subband Allocation Threshold Estimator 200 and along path 13 to Adaptive Bit Allocator 300, and passes the exponents and the unnormalized mantissas along path 12 to Steering Controller 400.

B. Subband Allocation Threshold Estimator

Referring to FIG. 7, Subband Allocation Threshold Estimator 200 estimates the number of bits required to quantize each subband in order to achieve a desired level of signal reproduction quality. The estimate is made in response to the coarse measure of subband contents produced by Coarse Level Quantizer 100 which is received from path 11. In a preferred embodiment of the invention, this coarse measure is the set of subband block-floating-point exponents.

The estimation process is closely related to the nature and degree of the desired signal reproduction quality; therefore many estimation schemes may be employed. In a preferred embodiment, psychoacoustic masking thresholds are utilized to achieve Compact Disc quality reproduction of multiple channels of wideband audio at low bit rates. In this embodiment, the bit allocation required for each subband to achieve psychoacoustic masking is estimated from the subband exponent and the "Steering Threshold" value shown in Table I. The Steering Threshold value is based on the number of bits required for each spectral component in a subband to keep quantizing noise below the masking threshold of a single sinewave signal whose frequency is centered in that subband. These values are conservative figures because wideband audio signals such as music normally contain many spectral components, and the masking effects produced by such signals are greater than the single sinewave case. The formula used to estimate the required allocation is:

$$E = \frac{1}{2}(F \cdot X_j + TH_j) \qquad (1)$$

where

E=allocation estimate,

F=−0.4375 (an empirically established factor), $TH_j$=Steering Threshold for subband j (see Table I), and $X_j$=value of exponent for subband j.

C. Adaptive Bit Allocator

Adaptive Bit Allocator 300 shown in FIG. 7 allocates a varying number of bits to the spectral components within the channels. In one embodiment of the present invention, all spectral components in all channels are quantized solely by bits allocated from a common Bit Pool 350 shared among all channels.

A preferred embodiment of the present invention for transform coders excludes the lowest frequency transform coefficients from the adaptive bit allocation process and assigns to them a fixed number of bits. If the lowest frequency transform coefficients are included in the adaptive bit allocation process, a transform coder will generate audible quantization noise at a frequency equal to the subband block rate whenever an input signal contains low-frequency spectral components whose period is large compared to the subband block length. Assuming a 512 point transform with a signal sample rate of 48 kHz, the subband block rate is 93.7Hz (or 48 kHz/512).

The predominant cause is the fact that the portion of the signal represented by the lowest frequency transform coefficient is often inaudible. The adaptive bit allocation process assumes each quantized signal spectral component will provide some masking of its own quantization noise, but because it is often inaudible, the quantized lowest frequency transform coefficient cannot always mask its own quantizing noise.

Another embodiment of the present invention also excludes from the adaptive bit allocation process the lowest amplitude spectral components. In a preferred embodiment using the block-floating-point scheme described above, the lowest amplitude spectral components excluded from adaptive bit allocation are those components represented by mantissas within subbands having a biased subband exponent value of 15.

Many other variations in the allocation technique are possible. Bit allocations may be based upon channel priority. For example, the channels may be divided into two or more groups, each group of channels having its own bit pool, the size of the pool being proportional to the priority of the associated channels. Further, such groups may consist of only one channel. In addition, selected subbands from some or all channels may be excluded from the adaptive allocation process and simply assigned a fixed number of bits.

The allocation process used in a preferred embodiment of the present invention is based on spectral component amplitude values. This allocation process may be based on peak-to-peak amplitude, root-mean-square (RMS) amplitude, or other functions of signal level.

The allocation process may be based solely on the coarse measure of subband contents. In a preferred embodiment of the present invention, this coarse measure is the subband exponent received from path 13 as depicted in FIG. 7. For ease of discussion, this preferred embodiment will be used to describe the allocation process in the following paragraphs.

The allocation process first establishes $X_{max}$ which equals the value of the largest subband exponent, hence the smallest peak subband spectral component amplitude, for all subbands in all channels. In this context and in the following discussion, "all" refers only to those subbands and channels which participate in an adaptive allocation process assigning bits from a common bit pool.

In the next step, the allocation process makes a "relative allocation" to the spectral components in all subbands. For each subband j, the value $R_j$ is calculated from the difference between $X_{max}$ and each subband exponent $X_j$, dividing this difference by four, truncating the quotient, and adding an Allocation Basis factor $B_j$ obtained from a table of values. Such a table of values for a preferred embodiment of the present invention is shown in the Table I column labeled Allocation Basis.

Conceptually, the Allocation Basis factors shown in Table I represent an ideal bit allocation for a wideband signal having one spectral component in each subband, all components of equal amplitude. The relative allocation process allocates more bits to subbands with larger components, i.e., subbands with smaller subband exponents. One additional bit is allocated to a spectral component for every 24 dB increase in amplitude as represented by the subband exponents.

In a preferred embodiment of the invention using the floating-point representation discussed above, each additional shift required to normalize a spectral component mantissa represents a decrease in spectral amplitude of approximately 6 dB. For example, the amplitude of a normalized spectral component with a floating point exponent equal to $0101_2$ is about 6 dB greater than the amplitude of a normalized component with an exponent equal to $0110_2$. A difference of four between the values of two subband exponents equals approximately a 24 dB difference in the amplitudes of their respective spectral components.

For example, all spectral components in subband Y, whose subband exponent has a value four less than the subband exponent for subband Z, will be allocated one bit more than that allocated to the spectral components in subband Z. If the difference between exponents is eight, two additional bits are allocated.

After the relative allocation is completed, an adjustment is made to the overall allocation to ensure that the total number of bits allocated equals the total number available for allocation. Allocation adjustment establishes an adjustment value A by taking the total number of bits available for allocation, subtracting the total number of bits allocated by relative allocation, dividing the difference by the number of all spectral components participating in adaptive bit allocation, rounding down the quotient to the next lowest integer, and adding the result to the relative allocation figure for each spectral component. Note that the adjustment value A will be either a positive or negative number depending upon whether the relative allocation assigned fewer or more bits than are available for adaptive allocation, respectively.

The number of bits allocated to each spectral component is equal to the algebraic sum $R_j+A$. See Equations 2a and 2b.

$$R_j = \text{INT}\left[\frac{X_{\max} - X_j}{4}\right] + B_j \quad (2a)$$

$$A = \text{FLOOR}\left[\frac{T - \sum_{j=1}^{SB} N_j \cdot R_j}{M}\right] \quad (2b)$$

where

A=allocation adjustment,

B=Allocation Basis factor (see Table I),

M=number of spectral components in all subbands, $N_j$=number of spectral components in subband j across all channels, $R_j$=relative allocation to each spectral component in subband j, SB=number of subbands, T=number of bits available for adaptive allocation, $X_j$=value of exponent for subband j, $X_{max}$=value of largest subband exponent across all channels, FLOOR[x] obtains the largest integer not greater than x, and INT[x] obtains the integer portion of x.

In general, some bits will remain after allocation adjustment because the FLOOR function in Equation 2b returns fractional bits per subband to the Bit Pool. The remaining bits may be allocated in any of several different ways. For example, they may be allocated by assigning one additional bit to spectral components across all channels, starting with the lowest frequency components and proceeding to higher frequency components until all remaining bits are assigned. If the signals in particular channels are given a higher priority, the remaining bits may be allocated to spectral components in the higher priority channels. If the coder system can work with variable length encoded signals, the remaining bits can be retained and added to the Bit Pool for quantizing subsequent subband blocks. Many other variations are possible.

In one embodiment, a ceiling is imposed upon the number of bits which may be allocated to each spectral component. A preferred value for this ceiling for a preferred embodiment of the present invention is 9 bits per transform coefficient.

The bit allocation process described above for a preferred embodiment of the invention may be modified without departing from the present invention. Bits may be allocated to subbands at a rate different from one bit per 24 dB increase in amplitude as discussed above. Furthermore, a variable rate of allocation as a function of subband frequency may be used. For example, by using a value of 6 for the denominator in Equation 2a for low frequency subbands below some frequency chosen within the range of 1 kHz to 4 kHz, a relative allocation of one bit per 36 dB increase in amplitude can be allocated to spectral components in those subbands for audio applications where the lower frequency spectral components are very important to perceived signal quality.

An adaptive subband steering process is described below which adapts in response to adaptive bit allocation requirements. If an encoder utilizes such a subband steering process, the adaptive bit allocation process may be reinvoked to allocate bits only to the unsteered subbands and the subbands in the composite channel. In a preferred embodiment of the invention, the adaptive bit allocation process occurs in response to steering control flags and composite subband exponents received from Steering Controller 400 along path 46, and the exponents for those subbands not steered received from path 13.

D. Steering Controller

1. Overview

Whenever Subband Allocation Threshold Estimator 200 estimates that more bits are required than are available to encode a subband block to achieve a desired level of coding accuracy, Steering Controller 400 steers one or more subbands to reduce the number of bits required to encode the subband block. Without subband steering in these cases, one or more spectral components in the subband block must be allocated fewer bits than that indicated as necessary by the Subband Allocation Threshold Estimator. This may cause audible quantizing noise. When a sufficient number of bits is available to allocate to all spectral components, subband steering is not required.

The subband steering process combines the spectral components of a subband from multiple channels to form a composite single-channel subband, thereby reducing the number of spectral components which must be quantized and transmitted. A steering control signal which conveys information about the spectral component levels of each channel in a steered subband is passed with the encoded composite channel spectral components to permit the receiving dequantizer to recover spectral components for each channel. It should be appreciated that, in general, the spectral components recovered from the composite channel are not identical to the spectral components a receiver will decode from discrete channels without subband steering. In many instances, however, the use of subband steering, particularly adaptive subband steering discussed below, causes no perceptible change in the recovered signal.

Those bits saved by encoding a composite channel subband rather than encoding a subband for discrete unsteered channels may be used by the adaptive bit allocation process to allocate to other subbands.

In a preferred embodiment of the invention for quantizing wideband audio signals, subbands which contain spectral components whose frequencies are lower than a cutoff frequency within the range of approximately 1 to 2 kHz are excluded from steering. More particularly for a transform-based embodiment grouping transform coefficients into subbands such as that shown in Table I, subband numbers zero to sixteen are excluded from steering. Other variations such as excluding some or all subbands from high priority channels, or including all subbands in all channels in the steering process are possible and do not depart from the scope of the present invention. In the following paragraphs, the terms "all subbands" and "all channels" are used to refer only to all subbands and channels which participate in the steering process.

2. Steering Process Description a. Subband Selection

When subband steering is required, the first step of the steering process selects which subbands will be steered. In a preferred embodiment of the invention, information pertaining to the subbands selected for steering is passed along path 41 as a set of steering control flags. The steering control flags and composite subband exponents are passed to Adaptive Bit Allocator 300 along path 46 for bit reallocation.

Many selection schemes are possible, but generally the selection is based upon one or more of the following: allocation threshold information received from path 21; information of actual bit allocations which will occur or have occurred without subband steering received from path 31; and spectral component level information received from path 12.

One scheme selects all subbands that will not otherwise receive at least the threshold number of bits. A variation of this method selects all subbands that will not otherwise receive at least the threshold number of bits starting with the subbands in which coding inaccuracies are least objectionable. For example, steering may start with the highest frequency subband, working down in frequency until sufficient bits are made available to complete the bit allocation process for all other subbands.

Another scheme selects subbands only from lower priority channels. In some multiple channel audio applications, certain channels carry signals intended to be presented in front of an audience and other channels carry signals intended to be presented to the side or rear of an audience. In such applications, the front channels may be assigned higher priority and therefore are the last channels to participate in subband steering. Of course, as discussed above, high-priority channels can also be excluded from the steering process.

Yet another scheme selects subbands on the basis of the ratio of spectral component levels between the channel with the largest spectral component within a given subband and all other channels for that subband. According to one approach, subbands with the largest ratios between channels are selected first for steering under the assumption that subbands with such ratios will be less subject to errors caused by out-of-phase signal cancellation. Subbands with out-of-phase components may also be adaptively excluded from steering. According to another approach, subbands with the largest ratios are selected last for steering under the assumption that the steering of subbands with small ratios will cause the least change in objective measures of localization.

b. Forming the Composite Subband

The second step of the steering process forms composite-channel subbands by combining the spectral components of the individual steered-channel subbands selected for steering. A preferred method sets each spectral component value in the composite subband equal to the average of the corresponding spectral component values in the steered channels. Alternative methods may form other linear combinations or weighted sums of the spectral component values in the steered channels.

According to this preferred method, spectral components in each composite subband may grossly misrepresent the amplitude of spectral components in the steered channels. For example, in a five-channel system in which only one of the channels is carrying a signal, a composite subband spectral component may differ from the steered spectral component by as much as 14 dB (20 $\log_{10} 5$). If adaptive bit allocation decisions are made on the basis of subband exponent values, then the subband exponents for a composite subband established in the same manner as that for unsteered channel subbands can significantly and adversely affect adaptive bit allocations. Any of several techniques may be used to solve this problem.

First, the actual peak value of each spectral component across all the steered channels may be used to inform the bit allocation decision; however, this technique increases the amount of side information that must be passed to a companion decoder. Second, the exponent for a composite subband can be set equal to the exponent of the steered channel subband containing the largest spectral component across the steered channel subbands, but this technique increases quantizing noise by preventing normalization of the composite subband spectral components. Third, the relative allocation (see Equation 2a above) for each spectral component in all composite subbands can be increased by one or more bits. This may be accomplished by using a table for composite subbands distinct from that used for unsteered subbands (for example, see Table I) to establish the Allocation Basis factor $B_j$, or it may be accomplished by adding either a pre-established or an adaptive number of bits to the number of bits otherwise allocated to unsteered channel subbands.

On the one hand, this third technique may allocate more bits than are necessary in cases where the spectral information is fairly uniform across the steered channel subbands. On the other hand, this technique may not allocate enough bits for systems with five channels or more in cases where only one channel within a subband contains spectral energy; however, this is usually not a problem because such subbands are rarely steered unless nonadaptive steering is utilized. Hence, this third technique generally gives good results in listening tests and is preferred for its simplicity.

Unless the process of selecting subbands for steering avoids selecting channels with out-of-phase spectral components, the preferred method of forming composite subband spectral components from the average of corresponding spectral components in the steered channels will subtractively combine the out-of-phase spectral components, thereby producing a signal loss in the presentation signal that may be audible. The process of forming the composite subband may avoid such signal loss by incorporating any of several out-of-phase compensation schemes.

Throughout the following discussion of compensation schemes, the term $SUM(k)_c$ shall represent the sum of the spectral component k within each of c channels, or $$SUM(k)_c = \sum_i^c SC(k)_i \qquad (3a)$$

where
  c=number of channels included in the partial sum,
  i∈{set of steered channels}, and
  $SC(k)_i$=amplitude of spectral component k in channel i.
Thus, $SUM(k)_c$ is a partial sum in the sense that the "complete" sum SUM(k) includes the spectral components from all channels included in the steering process, or $$SUM(k) = \sum_i^{CC} SC(k)_i = SUM(k)_{CC} \qquad (3b)$$

where CC=number of channels included in the steering process.

A first out-of-phase compensation scheme ensures that each average spectral component value in the composite channel subband is not substantially less than the largest of the corresponding individual spectral components. If a fraction of the absolute value of $SC(k)_{MAX}$, which is the largest magnitude spectral component k across all steered channels, is greater than the absolute value of the corresponding sum of spectral components SUM(k), then the fraction of the largest magnitude spectral component is taken as the spectral sum. This may be represented as $$\text{SUM}(k) = \begin{cases} \dfrac{SC(k)_{MAX}}{F} & \text{if } \left|\dfrac{SC(k)_{MAX}}{F}\right| > |\text{SUM}(k)|, \\ \text{SUM}(k) & \text{otherwise.} \end{cases} \quad (3c)$$

where F = a factor in the range from 2 to CC, the number of channels included in the steering process.

This scheme does not increase the number of bits required to represent the coded signal, but it can cause a companion decoder to generate abrupt phase changes in the reproduced signal. Although the human ear is relatively insensitive to phase changes in spectral components above approximately 2 kHz, these changes in phase may be perceptible in situations where they also cause abrupt changes in composite channel amplitude which are audible.

A second out-of-phase compensation scheme inverts the phase of a channel's spectral components before combining them into the composite channel if it determines that less cancellation will occur as compared to the cancellation without phase inversion. The use of phase inversion is passed as side information to the companion decoder which can restore the proper phase for each channel.

In a preferred embodiment, the relative amounts of out-of-phase cancellation is determined by performing two interim calculations as the spectral components of each channel are combined with their corresponding partial sums. The first interim calculation, represented below by Equation 3d, establishes a first inner product of a first set of values formed by adding each of the spectral components in the $c^{th}$ channel to the corresponding spectral component partial sums. The second interim calculation, represented by Equation 3e, establishes a second inner product of a second set of values formed by subtracting each of the spectral components in the $c^{th}$ channel from the corresponding spectral component partial sums. The inner products are established by calculating $$IP_{1c} = \sum_{k}^{SM} [\text{SUM}(k)_{c-1} + SC(k)_c] \cdot [\text{SUM}(k)_{c-1} + SC(k)_c] \quad (3d)$$

$$IP_{2c} = \sum_{k}^{SM} [\text{SUM}(k)_{c-1} - SC(k)_c] \cdot [\text{SUM}(k)_{c-1} - SC(k)_c] \quad (3e)$$

where
$IP_{1c}$ = first inner product for the first c channels,
$IP_{2c}$ = second inner product for the first c channels,
$k \in$ {set of spectral components in all steered subbands}, and
SM = number of spectral components included in the steering process.

If the second inner product is greater than the first inner product, the second inner product is taken as the new partial sum and an indication is passed to a companion decoder that the phase of the $c^{th}$ channel has been inverted. Otherwise, the first inner product is taken as the new partial sum and an indication is passed that the phase of the $c^{th}$ channel has not been inverted.

This scheme requires only a modest increase of one bit per channel, but it can adequately compensate for many signal losses due to out-of-phase cancellation. The increment of compensation may be decreased by increasing the number of bits used to pass phase change information to a decoder. For example, two bits per channel will permit the encoder to adjust individual channel phase in increments of 90 degrees.

The ability to make phase adjustments depends in part upon the implementation of the filter bank used in conjunction with the present invention. Phase adjustments can be easily be made for filter banks implemented by complex-valued transforms such as the DFT. For filter banks implemented by a TDAC transform, however, any phase adjustment other than simple inversion is more difficult.

For the Evenly-Stacked TDAC transform described by Princen and Bradley, an adjustment similar to a 90 degree change in phase can be accomplished by swapping spectral components between adjacent subband blocks. More particularly, this TDAC transform comprises the alternate application of a modified DCT and a modified DST. An exchange of transform coefficients between adjacent DCT blocks and DST blocks would approximate a 90 degree change in phase.

Whether or not the change is actually a 90 degree change in phase is not important. What is important is that spectral components are combined during the encode process in some manner which avoids out-of-phase cancellation yet permits proper reconstruction by a decode process. Using only two bits per channel, a TDAC encoder can indicate to a companion decoder which of four ways it combined channels: (1) without phase inversion within the same subband block, (2) with phase inversion within the same subband block, (3) without phase inversion but with swapping between adjacent subband blocks, and (4) with phase inversion and with swapping between adjacent subband blocks. A companion TDAC decoder can reverse the process to properly reconstruct the steered channels.

Swapping spectral components between adjacent subband blocks is especially attractive in embodiments of the present invention used in conjunction with TDAC filter in which the modified DCT and the modified DST are performed concurrently. Such an implementation is more fully described in International Publication No. WO 90/09022, referred to above.

A third out-of-phase compensation scheme is similar to the second scheme discussed above except that the calculation of inner products and the phase adjustment of a channel's spectral components is performed independently for each subband included in the steering process. In a preferred embodiment such as that shown in Table I where only spectral components above about 2 kHz are included in steering, twenty-two subbands per channel are included in the steering process. Therefore, eighty-eight bits of side information are required by a 5-channel system to pass subband phase inversion information to a decoder.

It should be appreciated by one skilled in the art that an embodiment of the present invention may utilize the three compensation schemes in various combinations.

c. Constructing the Steering Control Signal

The third step of the steering process constructs the steering control signal which will be used by the dequantizing process in a receiver to recover the steered channel spectral components from the composite channel. Many methods are possible.

In a Type I embodiment of the present invention, the steering control signal represents a level calculated from the amplitude, or alternatively the power of the spectral components in each subband for all steered channels. A channel's "calculated level" for a particular subband may be obtained from the peak value, the average, or other linear combination or weighted sum of the spectral components within that subband for that channel. A calculated level obtained from the average composite subband amplitude is preferred to avoid artifacts in the signal obtained from a companion decoder which manifest themselves as a subtle "chirping" sound.

One Type I method constructs a vector of elements for each steered subband representing the difference in calculated level between each steered channel and the composite channel. Each element of the steering control signal vector corresponds to one steered channel and represents the difference between the composite channel's calculated level and that steered channel's calculated level.

A second Type I method constructs a vector of factors for each steered subband representing the relative value of each steered channel's calculated level. Each element of the steering control signal vector represents the ratio between a steered channel's calculated level and the composite channel's calculated level.

The construction method should ensure that the ratios are not undefined or excessively large. Such a condition may occur for composite subbands representing spectral components in different channels which are substantially out of phase with one another. As mentioned above, this situation may be prevented by excluding channels from the steering process when such out-of-phase conditions exist, or by utilizing an out-of-phase compensation scheme. In the absence of such exclusion or compensation, however, a simple but adequate technique limits the factor to a value equal to the number of channels represented by the composite subband if the ratio is defined, and sets the factor to zero if the ratio is undefined, i.e., the composite subband's calculated level is substantially equal to zero.

A third and preferred Type I method constructs a vector of elements for each steered subband representing the absolute or non-relative value of each steered channel's calculated level.

In a Type II embodiment of the present invention, the steering control signal comprises a set of statistics for each steered subband which represent the sound field localization characteristics for that subband across all channels. The elements in the set represent a statistical measure of the apparent direction of the source of a multi-dimensional sound field. This set may include one or more directions, the standard deviation, and possibly higher order statistical measures of sound dispersal about the directions. In one embodiment of the present invention, a basic method constructs a vector for each steered subband representing only the primary spatial direction.

Figure 1:
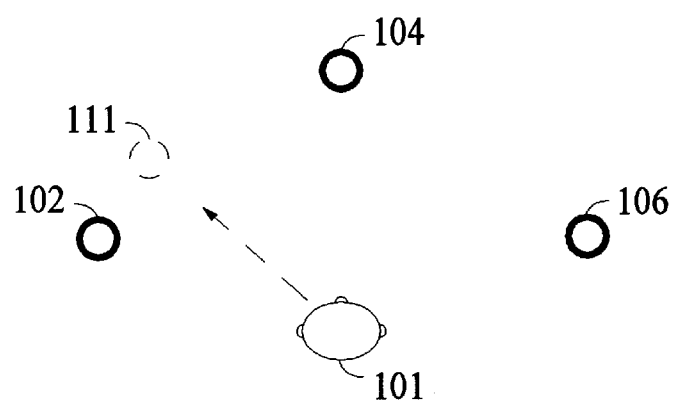
FIG. 1 is a conceptual diagram illustrating a person listening to a sound field produced by multiple presentation channels, but who perceives that a sound comes from a point between two presentation channels.
Figure 1:
Figure 9:
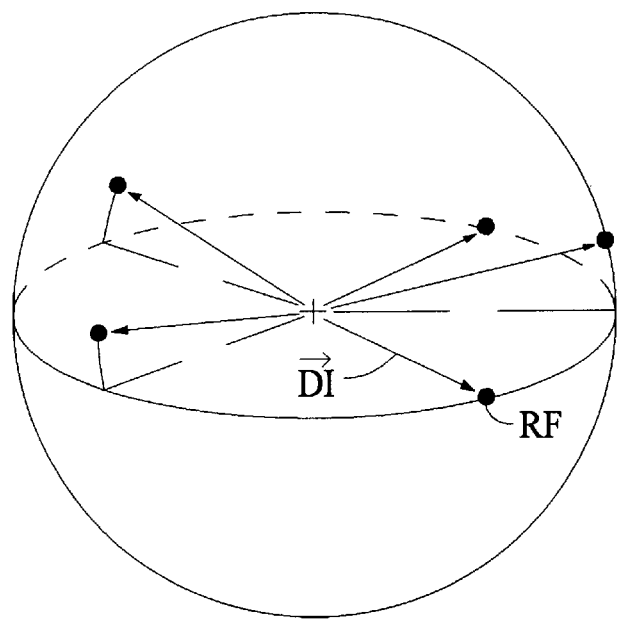
FIG. 9 is a hypothetical graphical representation of a reproduction system in three dimensions with five presentation channels.
Figure 2:
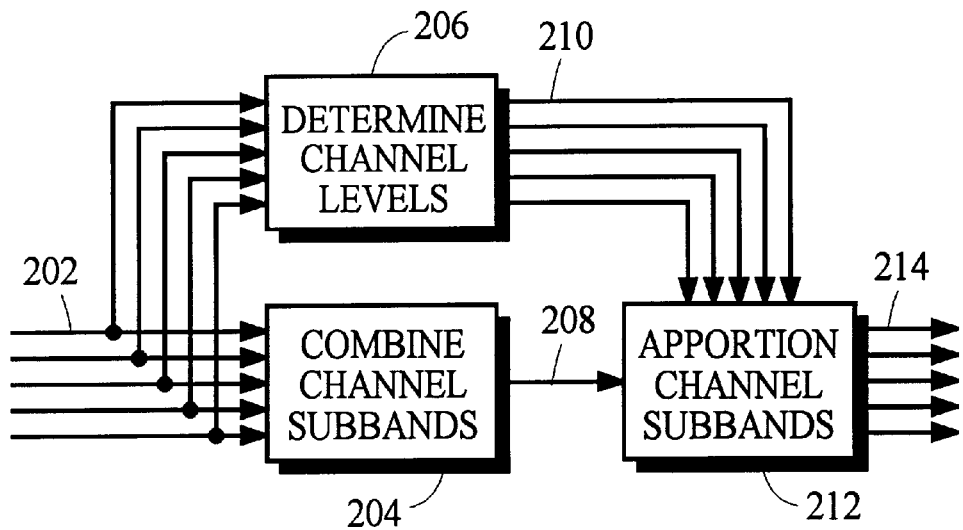
FIG. 2 is a conceptual diagram of a first or Type I embodiment of subband steering.
Figure 3:
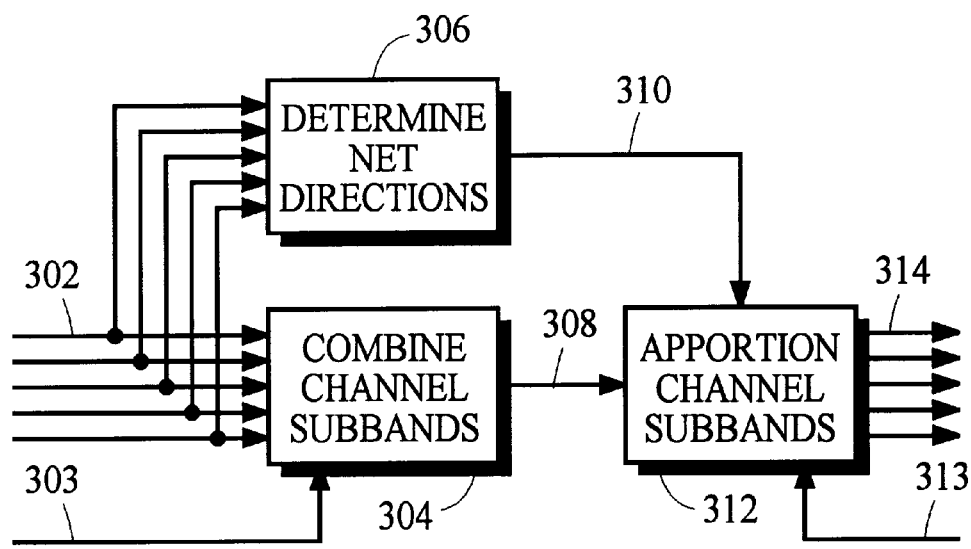
FIG. 3 is a conceptual diagram of a second or Type II embodiment of subband steering.
Figure 4:
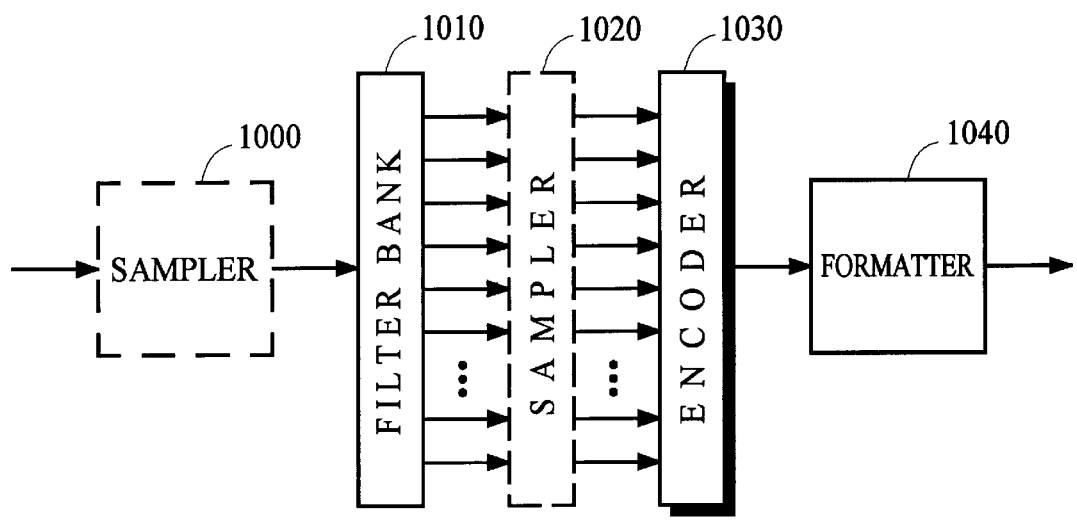
FIG. 4 is a functional block diagram of a subband encoder.
Figure 5:
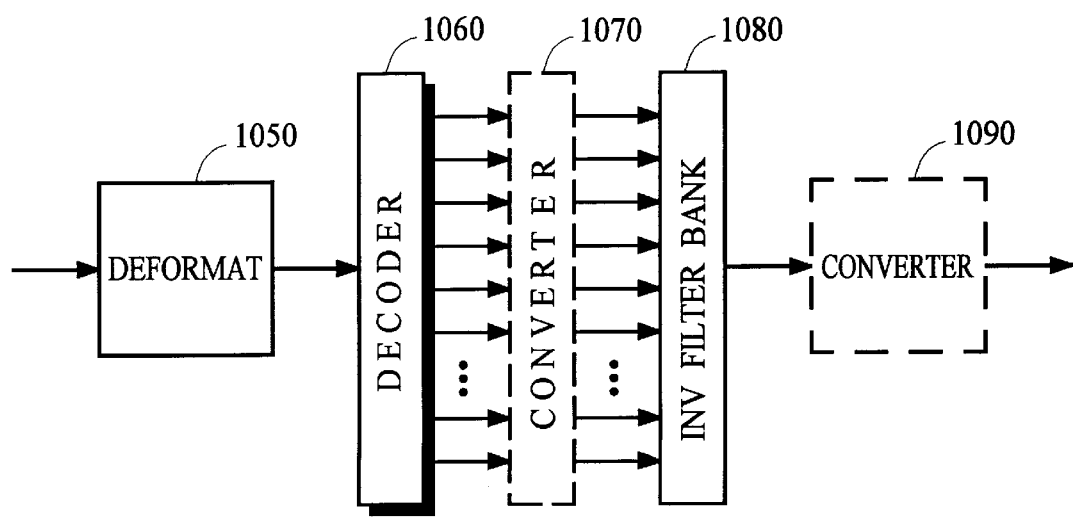
FIG. 5 is a functional block diagram of a subband decoder.
Figure 6:
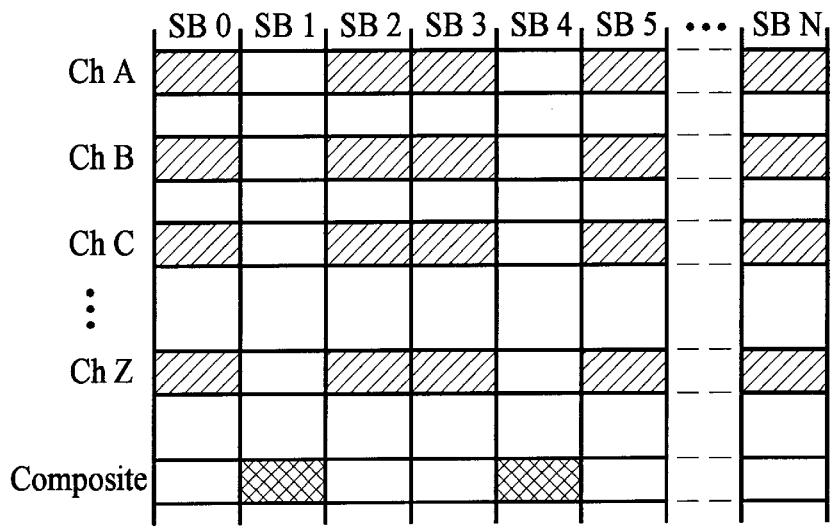
FIG. 6 is a hypothetical graphical illustration of subband steering.

The concept of this basic method may be better understood by referring to FIG. 9 which illustrates a hypothetical reproduction system comprising five presentation channels. Each of these hypothetical presentation channels, which correspond to one of the input channels, represents a loudspeaker located on the surface of a unit sphere. The intended listener is located at the sphere's center. One of the channels is labeled RF. The apparent direction of channel RF to the listener is represented by unit vector $\vec{DI}$.

According to this basic method of Type II coding, steering control signal vector $\vec{V}_j$ represents the principal direction of the sound field for steered subband j. Although a Cartesian coordinate system is a preferred representation for direction, other representations such as polar coordinates may be used without departing from the spirit of the invention. The steering control signal may be expressed as $$\vec{V}_j = \sum_{i=1}^{S} LI_{i,j} \cdot \vec{DI}_i = \vec{LI}_j \cdot \overline{DI} \tag{4}$$

where $\vec{DI}_i$=directional unit vector for channel i, $LI_{i,j}$=calculated level for subband j in channel i, S=total number of steered channels, $\vec{V}_j$=steering control signal vector for subband j, $\overline{DI}$=directional unit vectors for all steered channels, and $\vec{LI}_j$=calculated levels for subband j in all steered channels.

One advantage of Type II embodiments is that the coding format and bit requirements of the steering control signal is independent of the number of channels included in the steering process. On the other hand, the encoding steering process must be informed of the number and location for the sound sources represented by each of the input channels just as the decoding steering process must be informed of the number and placement of loudspeakers used in the receiving decoder system, thereby preserving the original multi-dimensional sound localization characteristics. Referring to FIG. 7, a direction, vector $\vec{DI}_i$ for each input channel required by a Type II embodiment of the invention is provided to the Steering Controller along path 2.

Type II encoders which employ adaptive subband steering must also pass to the decoder the $\vec{DI}_i$ vector for each input channel i. This information is necessary so that the decoder can convert the discrete or unsteered channel subbands into a set of signals suitable for the presentation system.

At the conclusion of the subband steering process, all spectral components in the unsteered channel subbands and the composite channel subbands should have been allocated sufficient information capacity to ensure coding noise is inaudible. For digital implementations of the present invention, this equates to allocating a sufficient number of bits such that quantizing noise will be inaudible.

E. Quantizer

Quantizer 500 prepares a quantized representation of the encoded signal for subsequent formatting into a form suitable for transmission or storage. The Quantizer receives steering control flags along path 41 that indicate which subbands were steered and passes them along path 51. It quantizes the steering control signal received from path 42 and passes the quantized information along path 52. The Quantizer also generates quantized spectral code words in response to the coarse quantization information received from path 43 and the spectral component values received from path 44, and passes the quantized code words along path 54. The coarse quantization information is also quantized and passed along path 53.

The format of the quantized steering control signal varies according to the method used to construct the steering control signal. In Type I embodiments of the invention, the steering control signal expressed as a difference-, an absolute-, or a relative-level vector may be coded as a vector of 8-bit numbers representing levels across a chosen dynamic range, for example, a range of 100 dB. By using these numbers as an index into a lookup table, each 8-bit number can represent a logarithmic increment of 0.39 dB (100 dB/256).

For Type II embodiments of the present invention, a steering control signal expressed as a directional vector of a sound field may be coded as a block of 4-bit mantissas sharing a 4-bit exponent. Generally, one mantissa is required for each dimension of the directional vector but this will depend upon the coordinate system used to represent directions.

Many variations in the quantization process are possible. In digital transform embodiments of the invention utilizing the block-floating-point representation discussed above, the Quantizer receives spectral component mantissas from path 44, normalizes them in response to the subband exponents received from path 43, truncates the normalized mantissas into code words with a bit length corresponding to the bit allocation information received from path 45, and passes the quantized code words along path 54. The unbiased subband exponents received from path 43 are adjusted or biased according to the master exponents also received from path 43. The biased subband exponents and master exponents are passed along path 53.

In one embodiment of the present invention, the audible effects of quantization errors may be decreased by adding a noise-like signal to each spectral component before quantization. The amplitude of the noise-like signal is chosen for each spectral component according to the number of bits allocated to that spectral component so that the mean amplitude of the noise-like signal matches the expected quantizing error.

For example, in a system using a two's complement representation in which spectral component mantissas are 8 bits in length, a mantissa may be represented by the notation $\#.\#\#\#\#\#\#\#_2$ which is a string of seven binary symbols # following the binary point, and a single binary symbol # prior to the binary point which represents the sign. Each symbol # may assume a value of either 0 or 1. The 8-bit mantissa $0.1100000_2$ represents the quantity $0.75_{10}$, for example. Assuming that three bits are allocated to the mantissa, quantization may construct a code word of the form $\#.\#\#2$ by truncating the 8-bit representation to 3 bits; thus, the minimum and maximum value of the quantizing error is $0.0000000_2$ and $0.0011111_2$, respectively. The audible effects of this quantizing error can be reduced by adding a noise-like signal to each 8-bit mantissa before it is quantized. The noise-like signal can be produced by a pseudo-random number generator which generates values uniformly within the range bounded by the minimum and maximum quantizing errors.

Periodically, the process which generates the noise-like signal is reinitialized. The reinitialization is marked by a "reset" flag included in the encoded subband block which a companion decoder can use to synchronize a complementary process. The period of the noise-like signal is not critical but is preferably in the range of from 50 milliseconds to two seconds. Shorter periods may cause the process to generate audible artifacts. Longer periods increase the time required for a companion decoder to initialize or to reinitialize after synchronization is lost.

In one embodiment, the reset flag is a single bit. In an alternative embodiment, the reset flag comprises two or more bits which provides an index into a table of values used to seed a pseudo-random number generator which generates the noise-like signal.

In situations where no subband signal is present, the noise-like signal may be audible unless spectral components in neighboring subbands can mask it. Therefore, in embodiments of the present invention utilizing a block-floating-point representation such as that discussed above, it may be desirable to not use this process to generate a noise-like signal for mantissas within subbands having large exponents.

F. Adaptive Bit Allocation Calculator

Referring to FIG. 8 which illustrates the present invention as it relates to subband decoding, Adaptive Bit Allocation Calculator 600 receives coarse quantization information for both discrete and composite channel subbands from path 58, steering control flags along path 59, and the number of bits available for allocation along path 65 from Bit Pool 650. The number of bits in Bit Pool 650 are equal to the number of bits in Bit Pool 350 of the encoder. The calculator determines the number of bits used by the encoder to quantize each spectral component code word by using a process substantially the same as the process used by Adaptive Bit Allocator 300 during the encode allocation process. This information is needed to parse the incoming coded signal and unpack the spectral information therein.

G. Dequantizer

Dequantizer 700 reverses the process used by Quantizer 500 during the encode process to reconstruct an approximation of each spectral component from the quantized code words received from path 56. In a preferred embodiment of the invention using the block-floating-point representation and adaptive bit allocation process discussed above, bit allocation information defining the bit lengths of the code words is received from path 61. An unnormalized representation for the spectral component mantissas is established using the subband exponents including master exponents received from path 57. The biased subband exponents are adjusted into unbiased from, and passed along path 72. A steering control signal is generated in response to the quantized steering control information received from path 55 using a process inverse to that used by the encode quantizing process. Steering control flags received from path 62 are passed along path 74 to the Inverse Steering Controller.

One measure of fidelity in coding systems is how closely the amplitude of the decoded or output spectral components resemble or "track" the amplitude of the original input spectral components. Generally, discrepancies of no more than approximately 0.5 dB between input and output spectral components are adequate for many high-fidelity applications.

Figure 10A:
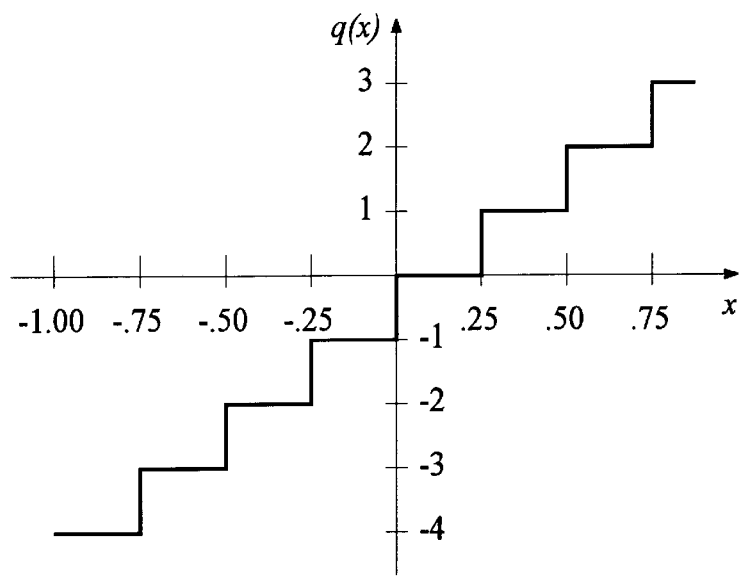
FIG. 10a is a hypothetical graphical illustration of quantizing inaccuracies inherent in a 3-bit two's complement representation of a truncated real value.

Spectral amplitude tracking within approximately 0.5 dB is possible for quantized two's complement representations of 4 bits or more, but such tracking cannot be assured for spectral components encoded in a two's complement representation using 3 bits or less. A 3-bit two's complement number can represent eight integer values from 4 to 3. Within an embodiment of the present invention utilizing the two's complement floating-point representation discussed above, mantissas to which 3 bits are allocated are quantized to one of eight integer values. FIG. 10a illustrates the mapping effect of quantizing function q(x). For example, spectral component mantissas within the range from and including 0.750 or $0.11_2$ up to but not including $1.00_{10}$ are quantized to the integer value 3. Mantissas within the range from and including $-0.25_{10}$ or $1.11_{12}$ up to but not including 0.00 are quantized to the integer value −1. Hence, spectral amplitude tracking inaccuracies for the largest spectral components which are mapped to 3 may be as much as 1, an error of approximately 33% or 3.2 dB. The relative quantizing inaccuracies may be even greater for smaller amplitude spectral components.

Figure 10B:
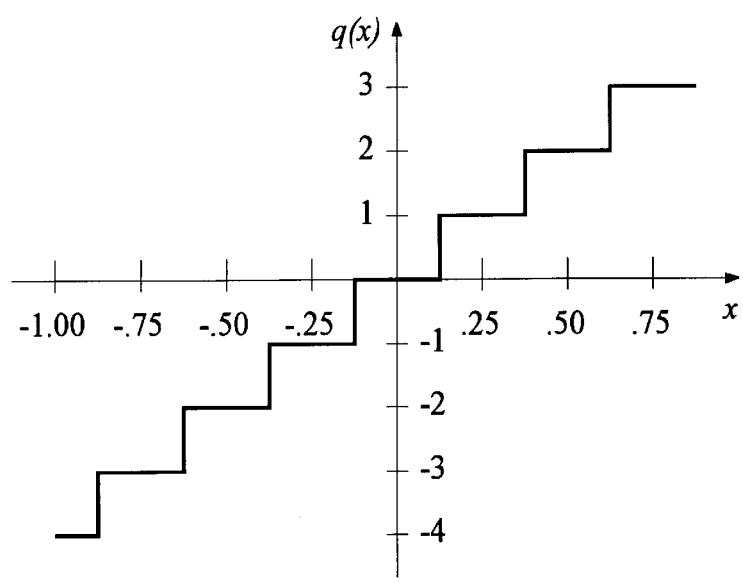
FIG. 10b is a hypothetical graphical illustration of quantizing inaccuracies inherent in a 3-bit two's complement representation of a real value with rounding before truncation.

Another quantizing function is shown in FIG. 10*b* in which mantissas are rounded to 3 bit accuracy before quantization. In this case, however, the quantization error for even the largest spectral component is still as much as 1 part in 6, or approximately 1.6 dB.

In a preferred embodiment of a decoder according to the present invention, spectral amplitude tracking may be improved by reconstructing the normalized mantissas using either of two techniques referred to herein as "statistically enhanced reconstruction" (SER). SER significantly improves the subjective quality of the decoded signal, reducing the "brittle" characteristics of high-frequency components often manifested by digital coding systems.

The first SER technique (SER-1) provides a substitute for the least significant bits of each mantissa which are lost through quantizing because only a limited number of bits are available to represent each mantissa. For example, in a system using two's complement representation in which mantissas are 8 bits in length, and assuming that three bits are allocated to a quantized Mantissa, dequantizing without SER-1 reconstructs a mantissa of the form $\#.\#\#00000_2$; thus, the string $\#.00\#\#\#\#\#_2$ represents the quantizing error. SER-1 assumes that the quantizing error is at most barely audible, and that the error is statistically closer to noise than it is to tones. It is preferable to assume noise-like characteristics because additive noise is generally less obtrusive than additive tones. SER-1 statistically reconstructs the value of the quantizing error by generating a noise-like signal with the same mean amplitude as the quantizing error. For the case of the quantizing function shown in FIG. 10*a*, SER-1 may be implemented by a function which generates pseudo-random numbers uniformly within the interval from and including $0.0000000_2$ up to and including $0.0011111_2$. For the quantizing function shown in FIG. 10*b*, SER-1 may be implemented by a function which generates pseudo-random numbers uniformly within the interval from and including $1.1110000_2$, or $-0.125_{10}$ up to but not including $0.0010000_2$ or $++0.125_{10}$. It should be appreciated by one skilled in the art that SER-1 may be implemented by other signal generators including noise generators with different amplitudes, different amplitude probability density functions, and different spectral shapes.

In a preferred embodiment, the SER-1 technique is applied to the composite channel and the discrete channels. SER-1 enhances the reconstruction of mantissas in the composite channel subbands prior to inverse steering, discussed below. SER-1 may also be applied to the discrete channel subbands reconstructed by inverse steering.

In alternative embodiments of the present invention utilizing representations other than the preferred block-floating-point representation discussed above, it may undesirable to use SER-1 for subbands in which little or no signal is present because it will generate a steady low-level noise signal which may be audible unless spectral components in neighboring subbands can mask it.

The second SER technique (SER-2) statistically alters the quantizing error in a manner complementary to that described above for the encoder. In response to a "reset" flag in a coded subband block, the decoder reinitializes a process which generates a noise-like signal identical to that generated in the companion encoder. The signal is scaled to match the expected amplitude of the quantizing error and subtracted from each spectral component after dequantization. SER-2 is not used in situations where the complimentary process was not used in the companion encoder.

H. Inverse Steering Controller

Inverse Steering Controller 800 reconstructs a discrete channel representation of the composite channel in response to a steering control signal, steering control flags, coarse quantization levels, and spectral component values received from paths 71 through 74, respectively. Coarse quantization level information and spectral components for unsteered subbands also received from paths 72 and 73 are passed through to the inverse filter bank along path 81.

In a preferred embodiment of the present invention, steered subbands are identified by the steering control flags received from path 74. Spectral components for each of the steered subbands represented by the composite channel are generated in response to the steering control signal received from path 71, composite channel subband exponents received from path 72, and the composite channel spectral components received from path 73. In general, the reconstruction method is inverse to that used to create the steering control signal during the encode process. The following paragraphs discuss reconstruction methods that may be used for each of the construction methods discussed above.

For Type I embodiments using a difference-level vector steering control signal, the reconstruction method can generate spectral components for each steered channel by algebraically adding the corresponding element of the difference-level vector to the corresponding composite channel spectral component value.

For Type I embodiments using a relative-level vector steering control signal, the reconstruction method can generate spectral components for each steered channel subband from the product of the elements in the relative-level vector and the corresponding composite channel subband spectral component values.

For Type I embodiments using an absolute-level vector steering control signal, the reconstruction method can generate spectral components for each steered channel by multiplying each spectral component in a composite subband by a factor established from the ratio of the corresponding element of the absolute-level vector to the composite subband's calculated level. Unless the calculated level for each composite channel subband is included in the encoded signal, the Inverse Steering Controller must derive it using the same process used in the encoder Steering Controller to determine the calculated levels for each steered channel subband.

In establishing the factor, however, the reconstruction method should ensure that the ratio of steering control information to the composite subband calculated level is not undefined or excessively large. Such a condition may occur for composite subbands representing spectral components in different channels which are substantially out of phase with one another. As mentioned above, this situation may be prevented by excluding channels from the steering process when such out-of-phase conditions exist, or by utilizing an out-of-phase compensation scheme. In the absence of such exclusion or compensation, however, a simple but adequate technique limits the factor to a value equal to the number of channels represented by the composite subband if the ratio is defined, and sets the factor to zero if the ratio is undefined, i.e., the composite subband's calculated level is substantially equal to zero.

Type II embodiments use a directional vector form of steering control signal. In order to preserve the spatial characteristics of the encoded signal, the reconstruction process must take into account the number and location of loudspeakers installed at the decoding site in order to adjust the amplitude of the reconstructed steered channel subbands fed to the presentation channels. The direction vector $\vec{DO}_i$ for each presentation channel i is provided to the Inverse Steering Controller along path 82.

A preferred Type II reconstruction method can generate spectral components for each steered channel by apportioning the spectral components of the composite channel to one or more presentation channels so as to obtain a sound field with the spatial orientation, and possibly the dispersal characteristics, of the subband represented by the steering control signal. The apportionment to each spectral component is proportional to the calculated level for its presentation channel subband.

By applying Equation 4 to the presentation system, the steering control signal may be expressed as $$\vec{V}_j = \sum_{i=1}^{S} LO_{i,j} \cdot \vec{DO}_i = \overline{LO}_j \cdot \overline{DO} \qquad (5)$$

where $\vec{DO}_i$=directional unit vector for presentation channel i,
$LO_{i,j}$=calculated level for subband j in channel i,
S=total number of steered channels,
$\vec{V}_j$=steering control signal vector for subband j,
$\overline{DO}$=directional unit vectors for all steered channels, and
$\overline{LO}_j$=calculated levels for subband j in all steered channels.

Type II encoders which employ adaptive steering must also pass to the decoder the $\vec{DI}$ vectors. The calculated level information LI may be derived directly from the discrete channel spectral components. Hence, each unsteered subband may be mapped onto the presentation channels by solving for all channels j the equation $$\overline{LO}_j = \overline{LI}_j \cdot \overline{DI} \cdot \overline{DO}^{-1} \qquad (6)$$

where $\overline{DO}^{-1}$=inverse of the $\overline{DO}$ matrix.

One additional constraint imposed upon the calculated levels LO is that the loudness of the sound field produced by the presentation system should be equal to the loudness of the original sound field. More particularly, a constraint is imposed upon each $\overline{LO}_j$ vector such that the loudness or total level of the sound field for each subband produced by the presentation system is equal to the level of the subband in the original sound field. In a preferred embodiment of a Type II encoder, the level $L_j$ of composite subband j represents the average level for the steered channel subbands represented by the composite subband, or $$L_j = \frac{1}{S} \sum_{i=1}^{S} |LI_{i,j}|. \qquad (7)$$

The total level for all steered channels represented by the composite subband is $S \cdot L_j$.

Output levels for each channel i in subband j which preserve the loudness and directional characteristics of the original sound field may be established from adjustments to the $\overline{LO}$ vector obtained by rewriting the right hand portion of Equation 5 as $$\vec{V}_j = (\overline{LO}_j + \vec{Q}_j) \cdot \overline{DO} \text{ such that} \qquad (8)$$

$$\vec{Q}_j \cdot \overline{DO} = K_j \cdot \vec{\Phi} \text{ for all j} \qquad (9)$$

where $\vec{Q}_j$=desired adjustments to the $\overline{LO}_j$ vector,
$K_j$=length of the $\vec{Q}_j$ vector, and
$\vec{\Phi}$=a vector as described below.

The $\vec{\Phi}$ vector has no net direction, but the sum of the absolute value of its elements is one. It represents a set of calculated levels for each channel in a given presentation system which generates a sound field with no net direction.

The $\vec{\Phi}$ vector can be derived by techniques which solve an undercontstrained system of linear equations. See for example, Press, *Numerical Recipes: The Art of Scientific Computing*, New York: Cambridge University Press, 1986.

Hence, the $\vec{Q}_j$ vector for each subband j can be obtained by solving Equation 9 rewritten as $$\vec{Q}_j = K_j \cdot \vec{\Phi} \cdot \overline{DO}^{-1}. \qquad (10)$$

The direction of the $\vec{Q}$ vector is established by the product of the $\overline{DO}^{-1}$ matrix and the $\vec{\Phi}$ vector, both of which are known.

The length $K_j$ of the vector represents the difference between the desired level $S \cdot L_j$ and the total level of the sound field obtained from Equation 6, or $$K_j = S \cdot L_j - \sum_{i=1}^{S} |LO_{i,j}|. \qquad (11)$$

II. Alternative Embodiments of Invention

A. Multiple Directional Vectors for Subband Steering

As discussed above, the steering control signal may be constructed to statistically represent the principal direction of the sound field created by a steered subband. An alternative method constructs a set of statistics for each steered subband which represents multiple directions. The number of directions may be fixed, or may be adaptively based upon the disparity of the principal directions and the amplitude of the subband signal originating from the principal directions.

B. Adjustments to Dynamic Range and Gain

As mentioned above, a preferred embodiment of the present invention is capable of reproducing a signal with a dynamic range in excess of 100 dB. It is not uncommon, however, that some applications do not want or cannot use the full range For example, a broadcaster may wish to compress the dynamic range of the transmitted signal to improve its signal-to-noise ratio, and an owner of a motion picture theater with high ambient noise may prefer to compress motion picture soundtracks so that softer soundtrack passages are audible. Channel selective gain may also be desired to compensate for room acoustics or presentation system characteristics.

Although it is possible to use conventional signal compressors, expanders, and amplifiers to adjust the dynamic range and gain of a signal before it has been encoded or after it has been decoded, such changes may be made by the encoder after encoding and/or y the decoder before decoding by altering the subband exponents.

For example, a two-to-one decrease in dynamic range may be accomplished by dividing every subband exponent by two. A 6 dB gain may be realized by adding one to each subband exponent. Furthermore, such adjustments may be made to selected subbands and/or channels similar to that done by multiband equalizers by restricting such alterations to selected channel/subband exponents.

Adjustments made by an encoder to the dynamic range of an encoded signal can be reversed by a companion decoder if the characteristics of the adjustment are known beforehand by the decoder or are provided to the decoder through side-information in the encoded signal.

C. Ancillary Blocks

The present invention may be used to encode multiple channels of information that is interleaved with blocks of other information which may be either related or unrelated to the multiple channel information. As discussed above, the encoded multiple-channel information is encoded into what is referred to as subband blocks. The additional interleaved blocks are referred to here as ancillary blocks.

Ancillary blocks are similar to subband blocks, but are blocks which can be processed by an encoder and a decoder in addition to the subband blocks required to represent the multiple channel information. The subband block rate for each channel in a preferred embodiment of the present invention is 93.75 Hz (48,000 samples per second/512 samples per block). An encoding/decoding system implemented according to this preferred embodiment of the present invention which can process subband blocks at a rate in excess of 93.75 Hz are capable of also processing ancillary blocks. For other embodiments, the subband rate may differ.

A special key may be inserted into each block allowing the decoder to identify which blocks are subband blocks and which are ancillary blocks. Furthermore, ancillary blocks intended for different purposes may be designated by different key values. For example, 4 bits of each block could identify the block type: $0000_2$ for subband blocks, and $0001_2$ through $1111_2$ designating any of 15 different ancillary block types.

Alternatively, each block can contain a block number comprising, say, 7 bits which increments from 0 to 127 and then wraps around again to 0. A scheme can be established in which certain block numbers are reserved for ancillary blocks. Many other variations should be apparent to one skilled in the art.

In motion picture film applications, for example, the present invention may be utilized to digitally encode multiple channels of audio information onto the film in synchronization with the picture. The choice of technique used to affix the encoded signal to the film is not relevant here, and is beyond the scope of the present invention. A standard film speed is 24 picture frames per second; therefore approximately 3.9 subband blocks are required per picture frame to realize a subband block rate of 93.75 Hz. Encoding any number of blocks in excess of 3.9 blocks per picture frame provides an excess capacity which can be used for ancillary blocks.

If four blocks are encoded for each picture frame, a four second segment of film containing 96 picture frames will also contain 384 encoded blocks. Within this four second segment, only 375 subband blocks are required to represent audio information. The remaining 9 blocks, the ancillary blocks, may be used for any purpose related or unrelated to the audio information or the picture. In one embodiment of the invention, each segment of 128 blocks comprises a fixed sequence of 42 subband blocks, 1 ancillary block, 42 subband blocks, 1 ancillary block, 41 subband blocks, and 1 ancillary block. It should be appreciated by one skilled in the art that alternative fixed sequences or adaptive sequences are possible, and that a number of subband blocks per picture frame other than four may be encoded.

The ancillary blocks may carry general information about the encoding process required by the decoder such as the total number of channels, the size of the adaptive allocation bit pool, and the spatial orientation of the loudspeaker system assumed by the encoder. These ancillary blocks may be encoded at the start of each reel or throughout the film, either to simplify restarting a film in the middle of a reel or to convey adaptive information used by the encoder.

The ancillary blocks may carry other information related to the film such as film projector controls, film editing information, and information for loading into software controlled devices. For example, programs or tables required by a decoder can be encoded on the film and loaded into decoder memory at the time the film is run for a showing. Decoder compatibility with current and future encoding schemes can thereby be achieved. The only function required to remain resident in the decoder is the means to identify block types and load ancillary block data into decoder memory.

TABLE I

Transform Coefficient Subband Grouping

| Master Exp | Subband No. | Coefficient Numbers | Allocation Basis | Steering Threshold |
|---|---|---|---|---|
| MEXP0 | 0 | 0 | 6<sup>(·)</sup> | 16 |
| | 1 | 1 | 5<sup>(+)</sup> | 11 |
| | 2 | 2 | 5 | 11 |
| | 3 | 3 | 5 | 11 |
| | 4 | 4 | 5 | 11 |
| | 5 | 5 | 5 | 11 |
| | 6 | 6 | 5 | 11 |
| | 7 | 7 | 5 | 11 |
| | 8 | 8 | 5 | 11 |
| | 9 | 9 | 5 | 10 |
| | 10 | 10 | 5 | 9 |
| | 11 | 11 | 5 | 8 |
| | 12 | 12–13 | 4 | g |
| | 13 | 14–15 | 4 | 8 |
| | 14 | 16–17 | 4 | 8 |
| | 15 | 18–19 | 4 | 8 |
| MEXP1 | 16 | 20–21 | 4 | 8 |
| | 17 | 22–24 | 4 | 8 |
| | 18 | 25–27 | 4 | 8 |
| | 19 | 28–31 | 4 | 8 |
| | 20 | 32–35 | 4 | 8 |
| | 21 | 36–39 | 4 | 8 |
| | 22 | 40–43 | 4 | 8 |
| | 23 | 44–47 | 4 | 8 |
| | 24 | 48–51 | 3 | 8 |
| | 25 | 52–57 | 3 | 9 |
| | 26 | 58–67 | 3 | 9 |
| | 27 | 68–77 | 3 | 9 |
| | 28 | 78–87 | 3 | 9 |
| | 29 | 88–97 | 3 | 8 |
| | 30 | 98–107 | 3 | 8 |
| | 31 | 108–117 | 3 | 8 |
| | 32 | 118–127 | 3 | 7 |
| | 33 | 128–137 | 3 | 9 |

TABLE I-continued

Transform Coefficient Subband Grouping

| Master Exp | Subband No. | Coefficient Numbers | Allocation Basis | Steering Threshold |
|---|---|---|---|---|
|  | 34 | 138–147 | 2 | 9 |
|  | 35 | 148–162 | 2 | 8 |
|  | 36 | 163–180 | 0 | 8 |
|  | 37 | 181–198 | 0 | 8 |
|  | 38 | 199–216 | 0 | 8 |

(*)For the TDAC transform, MDST coefficient 0 is always zero; therefore exponent and mantissa for coefficient 0 need not be quantized. The length of MDCT coefficient 0 is fixed at 9 bits.
(+)For the TDAC transform, the bit length for MDST coefficient 1 is fixed at 9 bits. The bit length for MDCT coefficient 1 is established by adaptive bit allocation.

We claim:

1. An apparatus for encoding audio information for a plurality of audio channels comprising:

one or more input terminals receiving subband signals for the plurality of audio channels, a coarse-level quantizer coupled to the one or more input terminals, wherein the coarse-level quantizer derives coarse measures of subband signal contents, a subband-allocation estimator coupled to the coarse-level quantizer, wherein the subband-allocation estimator derives an estimated number of bits to quantize the subband signals in response to the coarse measure of subband signal contents, a steering controller coupled to the one or more input terminals and to the subband-allocation estimator, wherein the steering controller generates composite representations of subband signals in respective frequency subbands for a plurality of the audio channels in response to the estimated number of bits, and generates steering control information representing levels of the subband signals represented by the composite representations, an adaptive-bit allocator coupled to the coarse-level quantizer and to the steering controller, wherein the adaptive-bit allocator allocates bits to the composite representations and to subband signals not represented by the composite representations in response to the coarse measure of subband contents and the steering control information, and a quantizer coupled to the one or more input terminals and to the steering controller, wherein the quantizer quantizes the composite representations and quantizes subband signals not represented by the composite representations.

2. An apparatus according to claim 1 wherein the adaptive-bit allocator allocates the bits to the composite representations and to subband signals not represented by the composite representations from a common pool of bits.

3. An apparatus according to claim 1 wherein the steering controller, in response to the estimated number of bits, adaptively selects the respective subbands for which the composite representations are generated.

4. An apparatus according to claim 1 wherein the steering controller generates the composite representations in a manner that reduces signal loss caused by subband signals being out of phase.

5. An apparatus according to claim 1 wherein the quantizer introduces a noise-like component having an amplitude matched to an expected quantizing error.

6. An apparatus for decoding input information representing a plurality of audio channels comprising:

one or more input terminals receiving the input information, wherein the input information comprises coarse measures of frequency subband content, quantized subband signals for a respective frequency subband for the plurality of audio channels, a quantized composite representation of subband signals in another respective frequency subband for the plurality of audio channels, and steering control information, an adaptive bit-allocation calculator coupled to the one or more input terminals, wherein the adaptive bit-allocation calculator determines numbers of bits to allocate to the quantized subband signals and the quantized composite representation of subband signals in response to the steering control information and the coarse measures of frequency subband content, a dequantizer coupled to the one or more input terminals and to the adaptive bit-allocation calculator, wherein the dequantizer dequantizes the quantized subband signals and the quantized composite representation of subband signals according to the numbers of bits determined by the adaptive bit-allocation calculator to generate dequantized subband signals and a dequantized composite representation of subband signals, respectively, and an inverse steering controller coupled to the dequantizer and to the one or more input terminals, wherein the inverse steering controller generates a plurality of subband signals in response to the dequantized composite representation and the steering control information.

7. An apparatus according to claim 6 wherein the adaptive bit-allocation calculator determines the numbers of bits to allocate to the quantized subband signals and the quantized composite representation from a common pool of bits.

8. An apparatus according to claim 6 wherein the input information comprises a phase-cancellation compensation signal and the inverse steering controller adapts its operation in response to the phase-cancellation compensation signal to generate the plurality of subband signals in a manner that introduces out-of-phase conditions.

9. An apparatus according to claim 6 wherein the dequantizer introduces a noise-like component having an amplitude matched to an expected quantizing error.

10. An apparatus for encoding audio information, wherein the apparatus comprises:

means for generating a discrete representation of subband signals in each respective frequency subband in a first set of frequency subbands for three or more channels of audio information representing a three-dimensional sound field, means for generating an aggregate representation of subband signals in each respective frequency subband in a second set of frequency subbands for the three or more of channels of audio information, wherein the aggregate representation for a respective frequency subband includes a composite audio-information signal and a steering control signal, and wherein the composite audio-information signal and the steering signal correspond to levels of the subband signals in the respective frequency subband, and means for encoding the discrete representations of subband signals and the aggregate representations of subband signals.

11. An apparatus according to claim 10 that comprises means for adaptively selecting the frequency subbands in the first and the second sets of frequency subbands according to estimates of information capacity requirements of the three or more channels of audio information.

12. An apparatus according to claim 10 wherein the aggregate representations are generated in a manner that reduces signal loss caused by subband signals being out of phase.

13. An apparatus for decoding input information, wherein the apparatus comprises:

means for receiving and decoding the input information to obtain discrete representations of subband signals in each respective frequency subband in a first set of frequency subbands for three or more channels of audio information representing a three-dimensional soundfield, and to obtain aggregate representations of subband signals in each respective frequency subband in a second set of frequency subbands for the three or more channels of audio information, means for generating discrete subband signals in the second set of frequency subbands for the three or more channels of audio information from the aggregate representations, wherein the aggregate representation for a respective frequency subband includes a composite audio-information signal and a steering control signal, and wherein the composite audio-information signal and the steering signal correspond to levels of subband signals in the respective frequency subband for three or more audio channels, and means for generating three or more channels of audio information representing a three dimensional sound field from discrete subband signals for the first set of frequency subbands and from discrete subband signals for the second set of frequency subbands.

14. An apparatus according to claim 13 that comprises means for receiving and decoding the input information to obtain a phase-cancellation compensation signal, wherein the means for generating the discrete subband signals in the second set of frequency subbands adapts its operation to compensate for techniques used to reduce signal loss caused by subband signals being out of phase.

15. A method for encoding audio information, the method comprising:

receiving input signals conveying three or more channels of audio information representing a three-dimensional sound field, applying one or more filters or one or more transforms to the input signals to generate a plurality of subband signals for each of the channels of audio information, combining subband signals to generate composite signals, wherein a respective composite signal is generated by combining subband signals in a respective frequency subband and at least one composite signal is generated by combining subband signals for at least three of the channels of audio information, generating a steering control signal for each respective composite signal representing levels of the subband signals that are combined to generate that respective composite signal, allocating a number of bits to and quantizing the composite signals and the subband signals not combined into composite signals to generate encoded information, and assembling the encoded information and information representing the steering control signals into an output signal.

16. A method according to claim 15 that allocates the bits to the composite signals and the subband signals not combined into composite signals from a common bit pool.

17. A method according to claim 15 that comprises reducing effects of out-of-phase cancellation by controlling levels of the subband signals combined to generate the composite signals.

18. A method according to claim 15 that comprises reducing effects of out-of-phase cancellation by controlling phase of one or more subband signals combined to generate the composite signals.

19. A method according to claim 15 that comprises excluding one or more subband signals for a selected channel of audio information from being combined into respective composite signals such that the number of bits to be allocated is less than or equal to an allocation limit.

20. A method according to claim 15 that comprises selecting in which frequency subbands composite signals are generated such that the number of bits to be allocated is less than or equal to an allocation limit.

21. A method according to claim 15 wherein the steering control signal for a respective frequency subband conveys either subtractive differences in levels or multiplicative ratios of levels for subband signals that are combined to generate the composite signal for that respective subband.

22. A method for decoding an input signal conveying an encoded representation of audio information, the method comprising:

disassembling an input signal to obtain encoded information and steering control signals, allocating a number of bits to and dequantizing the encoded information to obtain composite signals and subband signals, generating subband signals from the composite signals, wherein subband signals are generated for three or more audio channels in a respective frequency subband from a respective composite signal for that respective frequency subband according to a respective steering control signal that represents levels of subband signals that were combined to generate that respective composite signal, and applying one or more synthesis filters or one or more inverse transforms to the subband signals obtained from the input signal and generated from composite signals to generate three or more channels of audio information representing a three dimensional sound field.

23. A method according to claim 22 that allocates bits the encoded information from a common bit pool.

24. A method according to claim 22 that comprises compensating for techniques used to reduce effects of out-of-phase cancellation by controlling levels of one or more subband signals generated from the composite signals.

25. A method according to claim 22 that comprises compensating for techniques used to reduce effects of out-of-phase cancellation by controlling phase of one or more subband signals generated from the composite signals.

26. A method according to claim 22 wherein the steering control signal for a respective frequency subband conveys either subtractive differences in levels or multiplicative ratios of levels for subband signals combined to generate the composite signal for that respective subband.

* * * * *